United States Patent
Imagire

(10) Patent No.: US 7,724,255 B2
(45) Date of Patent: *May 25, 2010

(54) PROGRAM, INFORMATION STORAGE MEDIUM, AND IMAGE GENERATION SYSTEM

(75) Inventor: Takashi Imagire, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 686 days.

This patent is subject to a terminal disclaimer.

(21) Appl. No.: 11/600,197

(22) Filed: Nov. 16, 2006

(65) Prior Publication Data

US 2007/0115280 A1 May 24, 2007

(30) Foreign Application Priority Data

Nov. 21, 2005 (JP) .............................. 2005-336045

(51) Int. Cl.
G06T 17/00 (2006.01)
G06T 15/50 (2006.01)
G06T 15/60 (2006.01)
G09G 5/00 (2006.01)

(52) U.S. Cl. .................... 345/428; 345/426; 345/581
(58) Field of Classification Search .................. 345/426
See application file for complete search history.

(56) References Cited

U.S. PATENT DOCUMENTS

| | | | | |
|---|---|---|---|---|
| 5,821,940 A * | 10/1998 | Morgan et al. | ............... | 345/420 |
| 6,798,412 B2 * | 9/2004 | Cowperthwaite | ............ | 345/428 |
| 7,042,456 B2 * | 5/2006 | Chen et al. | ................... | 345/441 |
| 7,116,332 B2 * | 10/2006 | Boyd et al. | ................. | 345/559 |
| 2003/0169269 A1 | 9/2003 | Sasaki et al. | | |
| 2005/0179689 A1 * | 8/2005 | Ohshima | .................... | 345/428 |
| 2006/0018539 A1 * | 1/2006 | Sato et al. | .................... | 382/173 |
| 2006/0044313 A1 | 3/2006 | Lake et al. | | |
| 2006/0221073 A1 | 10/2006 | Teler et al. | | |

FOREIGN PATENT DOCUMENTS

| | | | |
|---|---|---|---|
| JP | A 2002-373348 | * | 12/2002 |
| JP | A-2005-520234 | | 7/2005 |

* cited by examiner

Primary Examiner—Kee M Tung
Assistant Examiner—Robert Craddock
(74) Attorney, Agent, or Firm—Oliff & Berridge, PLC

(57) ABSTRACT

A program for generating an image, the program causing a computer to function as: an object space setting section which sets an object in an object space; a vertex processing section which performs per-vertex processing; and a pixel processing section which performs per-pixel processing, wherein, when subjecting an object of a first group to predetermined processing which is implemented by a first processing and a second processing, the vertex processing section performs the first processing with a processing load lower than a processing load of the second processing, and the pixel processing section performs the second processing; and wherein, when subjecting an object of a second group differing from the first group to the predetermined processing which is implemented by a third processing and a fourth processing, the vertex processing section performs the third processing with a processing load higher than a processing load of the fourth processing, and the pixel processing section performs the fourth processing.

18 Claims, 18 Drawing Sheets

$I1 = Ka \times Ia + Kd \times Id \times (N1 \cdot L)$
$I2 = Ka \times Ia + Kd \times Id \times (N2 \cdot L)$
$I3 = Ka \times Ia + Kd \times Id \times (N3 \cdot L)$ $IJ = Ka \times Ia + Kd \times Id \times (NJ \cdot L)$

PROGRAM, INFORMATION STORAGE MEDIUM, AND IMAGE GENERATION SYSTEM

Japanese Patent Application No. 2005-336045, filed on Nov. 21, 2005, is hereby incorporated by reference in its entirety.

BACKGROUND OF THE INVENTION

The present invention relates to a program, an information storage medium, and an image generation system.

An image generation system (game system) has been known which generates an image viewed from a virtual camera (given view point) in an object space (virtual three-dimensional space) in which an object such as a car or a character is disposed. Such an image generation system is very popular as a system which enables a user to experience so-called virtual reality.

Such an image generation system involves vertex processing performed in vertex units (per-vertex processing) and pixel processing performed in pixel units (per-pixel processing).

In a known image generation system, assignment of processing to a vertex processing section which performs vertex processing and a pixel processing section which performs pixel processing has not been sufficiently taken into consideration. Therefore, unnecessary vertex processing or pixel processing may be performed.

JP-A-2002-373348 discloses related-art technology in this field.

SUMMARY

According to a first aspect of the invention, there is provided a program for generating an image, the program causing a computer to function as:

an object space setting section which sets an object in an object space;

a vertex processing section which performs per-vertex processing; and a pixel processing section which performs per-pixel processing, wherein, when subjecting a background object to predetermined processing which is implemented by a first processing and a second processing, the vertex processing section performs the first processing with a processing load lower than a processing load of the second processing, and the pixel processing section performs the second processing; and wherein, when subjecting a moving object to the predetermined processing which is implemented by a third processing and a fourth processing, the vertex processing section performs the third processing with a processing load higher than a processing load of the fourth processing, and the pixel processing section performs the fourth processing.

According to a second aspect of the invention, there is provided a program for generating an image, the program causing a computer to function as:

an object space setting section which sets an object in an object space;

a vertex processing section which performs per-vertex processing; and a pixel processing section which performs per-pixel processing, wherein, when subjecting an object of a first group to predetermined processing which is implemented by a first processing and a second processing, the vertex processing section performs the first processing with a processing load lower than a processing load of the second processing, and the pixel processing section performs the second processing; and wherein, when subjecting an object of a second group to the predetermined processing which is implemented by a third processing and a fourth processing, the vertex processing section performs the third processing with a processing load higher than a processing load of the fourth processing, and the pixel processing section performs the fourth processing, a primitive plane forming the object of the second group being smaller than a primitive plane forming the object of the first group.

According to a third aspect of the invention, there is provided a program for generating an image, the program causing a computer to function as:

an object space setting section which sets an object in an object space;

a vertex processing section which performs per-vertex processing; and a pixel processing section which performs per-pixel processing, wherein, when subjecting an object of a first group to predetermined processing which is implemented by a first processing and a second processing, the vertex processing section performs the first processing with a processing load lower than a processing load of the second processing, and the pixel processing section performs the second processing; and wherein, when subjecting an object of a second group differing from the first group to the predetermined processing which is implemented by a third processing and a fourth processing, the vertex processing section performs the third processing with a processing load higher than a processing load of the fourth processing, and the pixel processing section performs the fourth processing.

According to a fourth aspect of the invention, there is provided a computer-readable information storage medium storing any one of the above-described programs.

According to a fifth aspect of the invention, there is provided an image generation system for generating an image, the image generation system comprising:

an object space setting section which sets an object in an object space;

a vertex processing section which performs per-vertex processing; and a pixel processing section which performs per-pixel processing, wherein, when subjecting a background object to predetermined processing which is implemented by a first processing and a second processing, the vertex processing section performs the first processing with a processing load lower than a processing load of the second processing, and the pixel processing section performs the second processing; and wherein, when subjecting a moving object to the predetermined processing which is implemented by a third processing and a fourth processing, the vertex processing section performs the third processing with a processing load higher than a processing load of the fourth processing, and the pixel processing section performs the fourth processing.

According to a sixth aspect of the invention, there is provided an image generation system for generating an image, the image generation system comprising:

an object space setting section which sets an object in an object space;

a vertex processing section which performs per-vertex processing; and a pixel processing section which performs per-pixel processing, wherein, when subjecting an object of a first group to predetermined processing which is implemented by a first processing and a second processing, the vertex processing section performs the first processing with a processing load lower than a processing load of the second processing, and the pixel processing section performs the second processing; and wherein, when subjecting an object of a second group to the predetermined processing which is implemented by a third processing and a fourth processing, the vertex processing section performs the third processing with a processing load higher than a processing load of the fourth processing, and the pixel processing section performs the fourth processing, a primitive plane forming the object of the second group being smaller than a primitive plane forming the object of the first group.

According to a seventh aspect of the invention, there is provided an image generation system for generating an image, the image generation system comprising:

an object space setting section which sets an object in an object space;

a vertex processing section which performs per-vertex processing; and a pixel processing section which performs per-pixel processing, wherein, when subjecting an object of a first group to predetermined processing which is implemented by a first processing and a second processing, the vertex processing section performs the first processing with a processing load lower than a processing load of the second processing, and the pixel processing section performs the second processing; and wherein, when subjecting an object of a second group differing from the first group to the predetermined processing which is implemented by a third processing and a fourth processing, the vertex processing section performs the third processing with a processing load higher than a processing load of the fourth processing, and the pixel processing section performs the fourth processing.

DETAILED DESCRIPTION OF THE EMBODIMENT

Figure 1:
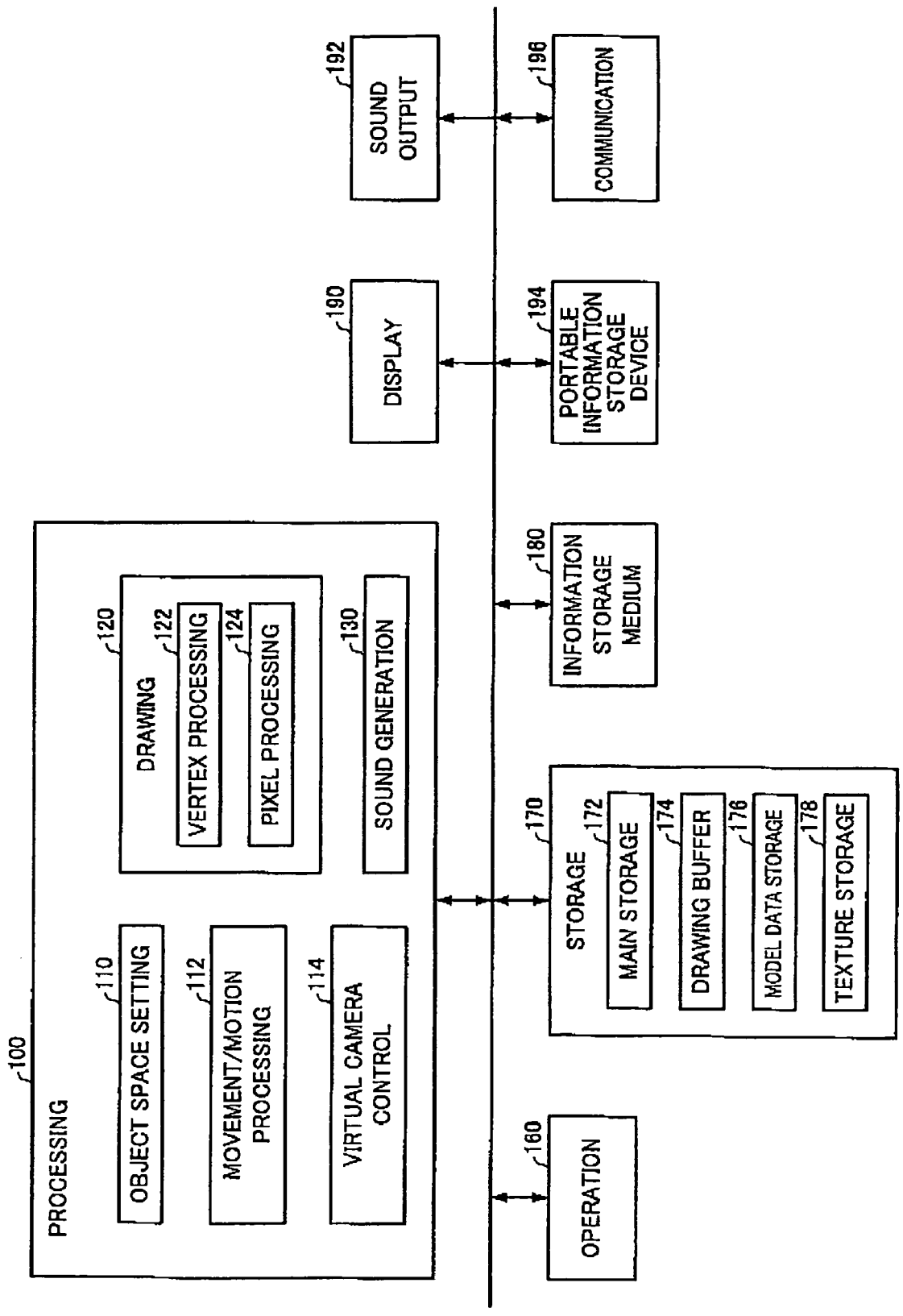
FIG. 1 is an example of a functional block diagram of an image generation system according to one embodiment of the invention.

The invention may provide a program, an information storage medium, and an image generation system which enable efficient assignment of processing to a vertex processing section and a pixel processing section.

According to one embodiment of the invention, there is provided an image generation system for generating an image, the image generation system comprising:

an object space setting section which sets an object in an object space;

a vertex processing section which performs per-vertex processing; and a pixel processing section which performs per-pixel processing, wherein, when subjecting a background object to predetermined processing which is implemented by a first processing and a second processing, the vertex processing section performs the first processing with a processing load lower than a processing load of the second processing, and the pixel processing section performs the second processing; and wherein, when subjecting a moving object to the predetermined processing which is implemented by a third processing and a fourth processing, the vertex processing section performs the third processing with a processing load higher than a processing load of the fourth processing, and the pixel processing section performs the fourth processing.

According to one embodiment of the invention, there is provided a program causing a computer to function as the above-described sections. According to one embodiment of the invention, there is provided a computer-readable information storage medium storing a program causing a computer to function as the above-described sections.

In these embodiments, when subjecting the background object to the predetermined processing, the pixel processing section performs the main processing with a high load. On the other hand, when subjecting the moving object to the predetermined processing, the vertex processing section performs the main processing with a high load. This enables efficient assignment of the processing to the vertex processing section and the pixel processing section, whereby the processing efficiency can be improved, and the quality of the generated image can be maintained, for example.

The term "high load" used herein refers to a case where the amount (number of steps) of at least one of functions and variables described in the program which implements the processing is large, a case where the functions are complicated (the number of orders is large), and the like. The term "low load" used herein refers to a case where the amount of at least one of functions and variables described in the program which implements the processing is small, a case where the functions are simple (the number of orders is small), and the like.

According to one embodiment of the invention, there is provided an image generation system for generating an image, the image generation system comprising:

an object space setting section which sets an object in an object space;

a vertex processing section which performs per-vertex processing; and a pixel processing section which performs per-pixel processing, wherein, when subjecting an object of a first group to predetermined processing which is implemented by a first processing and a second processing, the vertex processing section performs the first processing with a processing load lower than a processing load of the second processing, and the pixel processing section performs the second processing; and wherein, when subjecting an object of a second group to the predetermined processing which is implemented by a third processing and a fourth processing, the vertex processing section performs the third processing with a processing load higher than a processing load of the fourth processing, and the pixel processing section performs the fourth processing, a primitive plane forming the object of the second group being smaller than a primitive plane forming the object of the first group.

According to one embodiment of the invention, there is provided a program causing a computer to function as the above-described sections. According to one embodiment of the invention, there is provided a computer-readable information storage medium storing a program causing a computer to function as the above-described sections.

In these embodiments, when subjecting the object belonging to the first group, of which the constituent primitive plane is large, to the predetermined processing, the pixel processing section performs the main processing with a high load. On the other hand, when subjecting the object belonging to the second group, of which the constituent primitive plane is small, to the predetermined processing, the vertex processing section performs the main processing with a high load. This enables efficient assignment of the processing to the vertex processing section and the pixel processing section, whereby the processing efficiency can be improved, and the quality of the generated image can be maintained, for example.

According to one embodiment of the invention, there is provided an image generation system for generating an image, the image generation system comprising:

an object space setting section which sets an object in an object space;

a vertex processing section which performs per-vertex processing; and a pixel processing section which performs per-pixel processing, wherein, when subjecting an object of a first group to predetermined processing which is implemented by a first processing and a second processing, the vertex processing section performs the first processing with a processing load lower than a processing load of the second processing, and the pixel processing section performs the second processing; and wherein, when subjecting an object of a second group differing from the first group to the predetermined processing which is implemented by a third processing and a fourth processing, the vertex processing section performs the third processing with a processing load higher than a processing load of the fourth processing, and the pixel processing section performs the fourth processing.

According to one embodiment of the invention, there is provided a program causing a computer to function as the above-described sections. According to one embodiment of the invention, there is provided a computer-readable information storage medium storing a program causing a computer to function as the above-described sections.

In these embodiments, when subjecting the object belonging to the first group to the predetermined processing, the pixel processing section performs the main processing with a high load. On the other hand, when subjecting the object belonging to the second group to the predetermined processing, the vertex processing section performs the main processing with a high load. This enables efficient assignment of the processing to the vertex processing section and the pixel processing section, whereby the processing efficiency can be improved, and the quality of the generated image can be maintained, for example.

In each of the image generation system, program, and information storage medium, the predetermined processing may be light scattering processing.

This enables efficient light scattering processing, whereby scattering of light can be simulated.

In each of the image generation system, program, and information storage medium, the vertex processing section may perform the first processing which includes calculating a distance between a virtual camera and a vertex of an object; and the pixel processing section may perform the second processing which includes calculating a pixel color by out-scattering and a pixel color by in-scattering and adding the pixel color by out-scattering and the pixel color by in-scattering.

This allows the low-load first processing of the light scattering processing to be assigned to the vertex processing section and allows the high-load second processing to be assigned to the pixel processing section.

In each of the image generation system, program, and information storage medium, the vertex processing section may perform the third processing which includes calculating a vertex color by out-scattering and a vertex color by in-scattering; and the pixel processing section may perform the fourth processing which includes adding a pixel color by out-scattering and a pixel color by in-scattering.

This allows the high-load third processing of the light scattering processing to be assigned to the vertex processing section and allows the low-load fourth processing to be assigned to the pixel processing section.

In each of the image generation system, program, and information storage medium, the predetermined processing may be processing of texture coordinates calculation.

This enables efficient texture calculation processing, whereby the processing load of environment mapping or the like can be reduced.

In each of the image generation system, program, and information storage medium, the vertex processing section may perform the first processing which includes outputting data of a normal vector of a vertex; and the pixel processing section may perform the second processing which includes calculating texture coordinates of a pixel by subjecting a normal vector of the pixel to coordinate transformation and calculating a pixel color by texture mapping using the texture coordinates of the pixel.

This allows the low-load first processing of the texture coordinate calculation processing to be assigned to the vertex processing section and allows the high-load second processing to be assigned to the pixel processing section.

In each of the image generation system, program, and information storage medium, the vertex processing section may perform the third processing which includes calculating texture coordinates of a vertex by subjecting a normal vector of the vertex to coordinate transformation; and the pixel processing section may perform the fourth processing which includes calculating a pixel color by texture mapping using texture coordinates of a pixel.

This allows the high-load third processing of the texture coordinate calculation processing to be assigned to the vertex processing section and allows the low-load fourth processing to be assigned to the pixel processing section.

In each of the image generation system, program, and information storage medium, the predetermined processing may be lighting processing.

This enables efficient lighting processing, whereby a more realistic image can be generated.

In each of the image generation system, program, and information storage medium, the vertex processing section may perform the first processing which includes outputting data of a normal vector of a vertex; and the pixel processing section may perform the second processing which includes calculating light intensity of a pixel based on a normal vector of the pixel and an illumination model and calculating a pixel color based on the light intensity of the pixel.

This allows the low-load first processing of the lighting processing to be assigned to the vertex processing section and allows the high-load second processing to be assigned to the pixel processing section.

In each of the image generation system, program, and information storage medium, the vertex processing section may perform the third processing including calculating light intensity of a vertex based on a normal vector of the vertex and an illumination model; and the pixel processing section may perform the fourth processing including calculating a pixel color based on light intensity of a pixel.

This allows the high-load third processing of the lighting processing to be assigned to the vertex processing section and allows the low-load fourth processing to be assigned to the pixel processing section.

In each of the image generation system, program, and information storage medium, the predetermined processing may be color conversion processing.

This enables efficient color conversion processing, whereby conversion processing such as gamma correction can be realized.

In each of the image generation system, program, and information storage medium, the vertex processing section may perform the first processing which includes outputting data of a vertex position and a vertex color; and the pixel processing section may perform the second processing which includes converting a pixel color by using a conversion table or a conversion function.

This allows the low-load first processing of the color conversion processing to be assigned to the vertex processing section and allows the high-load second processing to be assigned to the pixel processing section.

In each of the image generation system, program, and information storage medium, the vertex processing section may perform the third processing which includes converting a vertex color by using a conversion table or a conversion function; and the pixel processing section may perform the fourth processing which includes outputting a pixel color calculated from the converted vertex color.

This allows the high-load third processing of the color conversion processing to be assigned to the vertex processing section and allows the low-load fourth processing to be assigned to the pixel processing section.

Embodiments of the invention will be further described below. Note that the embodiments described below do not in any way limit the scope of the invention laid out in the claims herein. In addition, not all of the elements of the embodiments described below should be taken as essential requirements of the invention.

1. Configuration

FIG. 1 shows an example of a functional block diagram of an image generation system (game system) according to this embodiment. Note that the image generation system according to this embodiment may have a configuration in which some of the elements (sections) shown in FIG. 1 are omitted.

An operation section 160 allows a player to input operation data. The function of the operation section 160 may be implemented by a lever, a button, a steering wheel, a microphone, a touch panel display, a casing, or the like. A storage section 170 functions as a work area for a processing section 100, a communication section 196, and the like. The function of the storage section 170 may be implemented by a RAM (VRAM) or the like.

An information storage medium 180 (computer-readable medium) stores a program, data, and the like. The function of the information storage medium 180 may be implemented by an optical disk (CD or DVD), a magneto-optical disk (MO), a hard disk, a memory (ROM), or the like. The processing section 100 performs various types of processing according to this embodiment based on a program (data) stored in the information storage medium 180. Specifically, a program for causing a computer to function as each section according to this embodiment (program for causing the computer to execute processing of each section) is stored in the information storage medium 180.

A display section 190 outputs an image generated according to this embodiment. The function of the display section 190 may be implemented by a CRT, an LCD, a touch panel display, a head mount display (HMD), or the like. A sound output section 192 outputs sound generated according to this embodiment. The function of the sound output section 192 may be implemented by a speaker, a headphone, or the like.

A portable information storage device 194 stores player's personal data, game save data, and the like. As the portable information storage device 194, a memory card, a portable game device, and the like can be given. The communication section 196 performs various types of control for communicating with the outside (e.g. host device or another image generation system). The function of the communication section 196 may be implemented by hardware such as a processor or a communication ASIC, a program, and the like.

The program (data) for causing a computer to function as each section according to this embodiment may be distributed to the information storage medium 180 (or storage section 170) from an information storage medium of a host device (server) through a network and the communication section 196. Use of the information storage medium of the host device (server) may also be included within the scope of the invention.

The processing section 100 (processor) performs processing such as game processing, image generation processing, or sound generation processing based on operation data from the operation section 160, a program, and the like. As the game processing, starting a game when game start conditions have been satisfied, proceeding with a game, disposing an object such as a character or a map, displaying an object, calculating game results, finishing a game when game end conditions have been satisfied, and the like can be given. The processing section 100 performs various types of processing using the storage section 170 (main storage section 172) as a work area. The function of the processing section 100 may be implemented by hardware such as a processor (e.g. CPU or DSP) or an ASIC (e.g. gate array) and a program.

The processing section 100 includes an object space setting section 110, a movement/motion processing section 112, a virtual camera control section 114, a drawing section 120, and a sound generation section 130. Note that the processing section 100 may have a configuration in which some of these sections are omitted.

The object space setting section 110 performs processing of positioning various objects (objects formed by a primitive surface such as a polygon, free-form surface, or subdivision surface) representing display objects such as a car, train, character, building, stadium, tree, pillar, wall, or map (topography) in an object space. Specifically, the object space setting section 110 determines the position and the rotational angle (synonymous with orientation or direction) of an object in a world coordinate system, and disposes the object at the determined position (X, Y, Z) and the determined rotational angle (rotational angles around X, Y, and Z axes). In more detail, model data of a moving object (car), a stationary object (building), and a background object (map and celestial sphere) is stored in a model data storage section 176 of the storage section 170. The object space setting section 110 sets (disposes) the object in the object space using the model data.

The movement/motion processing section 112 calculates the movement/motion (movement/motion simulation) of the object (e.g. car, character, train, or airplane). Specifically, the movement/motion processing section 112 causes the object (model object) to move in the object space or to make a motion (animation) based on the operation data input by the player using the operation section 160, a program (movement/motion algorithm), various types of data (motion data), and the like. In more detail, the movement/motion processing section 112 performs simulation processing of sequentially calculating movement information (position, rotational angle, speed, or acceleration) and motion information (position or rotational angle of each part object) on the object in frame (1/60 sec) units. The frame is a time unit for performing the object movement/motion processing (simulation processing) and the image generation processing.

The virtual camera control section 114 controls a virtual camera (view point) for generating an image viewed from a given (arbitrary) view point in the object space. In more detail, the virtual camera control section 114 controls the position (X, Y, Z) or the rotational angle (rotational angles around X, Y, and Z axes) of the virtual camera (processing of controlling the view point position, the line-of-sight direction, or the angle of view).

For example, when imaging the object (e.g. character, ball, or car) from behind using the virtual camera, the virtual camera control section 114 controls the position or the rotational angle (orientation) of the virtual camera so that the virtual camera follows a change in the position or rotation of the object. In this case, the virtual camera control section 114 may control the virtual camera based on information such as the position, rotational angle, or speed of the object obtained by the movement/motion processing section 112. Or, the virtual camera control section 114 may rotate the virtual camera at a predetermined rotational angle or may move the virtual camera along a predetermined path. In this case, the virtual camera control section 114 controls the virtual camera based on virtual camera data for specifying the position (moving path) or rotational angle of the virtual camera. When a plurality of virtual cameras (view points) exist, the above-described control is performed for each virtual camera.

The drawing section 120 performs drawing processing based on the results of various types of processing (game processing) performed by the processing section 100 to generate an image, and outputs the image to the display section 190. When generating a three-dimensional game image, model data including vertex data (e.g. vertex position coordinates, texture coordinates, color data, normal vector, or alpha value) of each vertex of the model (object) is input, and vertex processing (shading using a vertex shader) is performed based on the vertex data included in the input model data. When performing the vertex processing, vertex generation processing (tessellation, curved surface division, or polygon division) for dividing a polygon may be performed, if necessary.

The drawing section 120 performs geometric processing, hidden surface removal, alpha blending, and the like when drawing the object.

In geometric processing, the object is subjected to processing such as coordinate transformation, clipping, perspective projection transformation, or light source calculation. The model data (e.g. object's vertex position coordinates, texture coordinates, color data (luminance data), normal vector, or alpha value) after the geometric processing (after perspective transformation) is stored in the storage section 170.

The drawing section 120 may perform hidden surface removal by a Z buffer method (depth comparison method or Z test) using a Z buffer (depth buffer) in which the Z value (depth information) of the drawing pixel is stored. Specifically, the drawing section 120 refers to the Z value stored in the Z buffer when drawing the drawing pixel corresponding to the primitive of the object. The drawing section 120 compares the Z value stored in the Z buffer with the Z value of the drawing pixel of the primitive. When the Z value of the drawing pixel is the Z value in front of the virtual camera (e.g. small Z value), the drawing section 120 draws the drawing pixel and updates the Z value stored in the Z buffer with a new Z value.

Alpha blending refers to translucent blending (e.g. normal alpha blending, additive alpha blending, or subtractive alpha blending) based on the alpha value (A value).

The alpha value is information which can be stored while being associated with each pixel (texel or dot), such as additional information other than the color information. The alpha value may be used as mask information, translucency (equivalent to transparency or opacity), bump information, or the like.

The drawing section 120 includes a vertex processing section 122 and a pixel processing section 124.

The vertex processing section 122 performs vertex processing (per-vertex processing). In the vertex processing, geometric processing such as vertex movement processing, coordinate transformation (world coordinate transformation or camera coordinate transformation), clipping, or perspective transformation is performed according to a vertex processing program (vertex shader program or first shader program). The vertex data provided for the vertices forming the object is changed (updated or adjusted) based on the processing results. Rasterization (scan conversion) is performed based on the vertex data after the vertex processing, whereby the surface of the polygon (primitive) is associated with the pixels.

After rasterization, the pixel processing section 124 performs pixel processing (per-pixel processing). In the pixel processing (shading and fragment processing using a pixel shader), various types of processing such as reading the texture (texture mapping), setting/changing color data, translucent compositing, and anti-aliasing is performed according to a pixel processing program (pixel shader program or second shader program). The final drawing colors of the pixels forming the image are determined, and the drawing colors of the model subjected to perspective transformation are output (drawn) to a drawing buffer 174 (buffer which can store image information in pixel units; VRAM or rendering target). Specifically, the pixel processing involves per-pixel processing which sets or changes the image information (e.g. color, normal, luminance, and alpha value) in pixel units. This causes an image viewed from the virtual camera (given view point) to be generated in the object space.

The vertex processing and the pixel processing may be implemented by hardware which enables programmable polygon (primitive) drawing processing (i.e. programmable shader (vertex shader and pixel shader)) according to a shader program created using shading language. The programmable shader enables programmable per-vertex processing and per-pixel processing to increase the degrees of freedom of drawing processing, thereby significantly improving the representation capability in comparison with fixed drawing processing using known hardware.

In this embodiment, when subjecting an object belonging to a first group (first type) to predetermined processing, the vertex processing section 122 performs a first processing with a low processing load which makes up a first processing and a second processing which implement (execute or make up) the predetermined processing. The pixel processing section 124 performs the second processing with a high processing load. For example, when subjecting a background object to predetermined processing, the vertex processing section 122 performs the first processing with a low processing load, and the pixel processing section 124 performs the second processing with a high processing load. Or, when subjecting an object belonging to a first group of which the primitive plane forming the object is large to predetermined processing, the vertex processing section 122 performs the first processing with a low processing load, and the pixel processing section 124 performs the second processing with a high processing load.

On the other hand, when subjecting an object belonging to a second group (second type) to predetermined processing, the vertex processing section 122 performs a third processing with a high processing load which makes up a third processing and a fourth processing which implement (execute or make up) the predetermined processing. The pixel processing section 124 performs the fourth processing with a low processing load. For example, when subjecting a moving object to predetermined processing, the vertex processing section 122 performs the third processing with a high processing load, and the pixel processing section 124 performs the fourth processing with a low processing load. Or, when subjecting an object belonging to a second group of which the primitive plane forming the object is smaller than that of the object belonging to the first group, to predetermined processing, the vertex processing section 122 performs the third processing with a high processing load, and the pixel processing section 124 performs the fourth processing with a low processing load.

As examples of the predetermined processing, light scattering processing, processing of calculating the texture coordinates based on the normal vector (environment mapping), lighting processing, color (image information) conversion processing, and the like can be given. Note that the predetermined processing is not limited thereto. Various types of processing (shading processing) may be considered. Specifically, it suffices that the predetermined processing be processing of which the efficiency can be improved by assigning the processing to the vertex processing section 122 and the pixel processing section 124.

The sound generation section 130 performs sound processing based on the results of various types of processing performed by the processing section 100 to generate game sound such as background music (BGM), effect sound, or voice, and outputs the generated game sound to the sound output section 192.

The image generation system according to this embodiment may be a system dedicated to a single-player mode in which only one player can play a game, or may be a system provided with a multi-player mode in which two or more players can play a game. When two or more players play a game, game images and game sound provided to the players may be generated using one terminal, or may be generated by distributed processing using two or more terminals (game devices or portable telephones) connected through a network (transmission line or communication line), for example.

Figure 2:
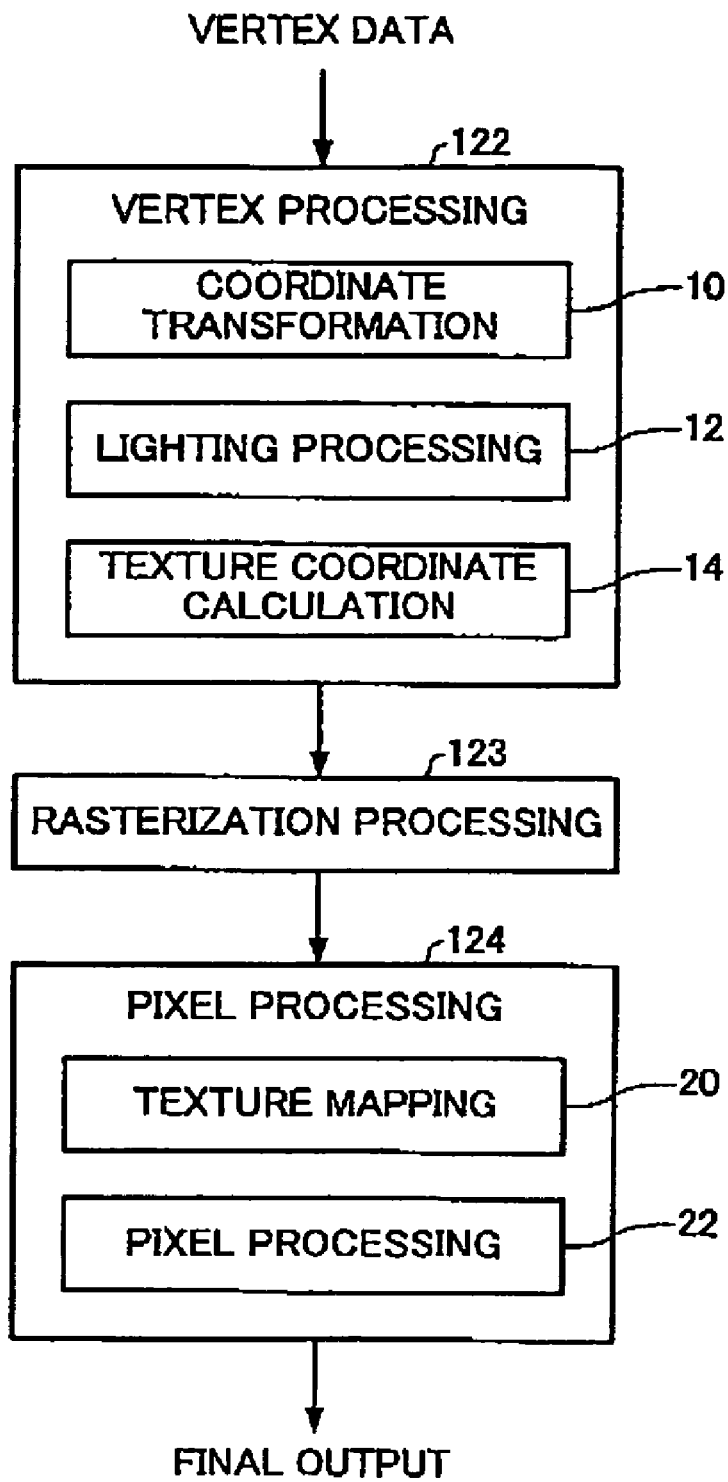
FIG. 2 shows a configuration example of a vertex processing section and a pixel processing section.

2. Method According to this Embodiment 2.1 Vertex Processing Section and Pixel Processing Section FIG. 2 shows a configuration example of the vertex processing section 122 and the pixel processing section 124. The vertex processing section 122 (vertex shader) may be implemented by hardware such as a vector calculation unit and software such as a vertex processing program (vertex shader program), for example. The pixel processing section 124 (pixel shader) may be implemented by hardware such as a vector calculation unit and software such as a pixel processing program (pixel shader program), for example. The vector calculation units assigned to the vertex processing section 122 and the pixel processing section 124 may be fixed, or assignment of a plurality of vector calculation units to the vertex processing section 122 and the pixel processing section 124 may be dynamically changed.

The vertex processing section 122 includes a coordinate transformation section 10, a lighting processing section 12, and a texture coordinate calculation section 14.

The coordinate transformation section 10 transforms the coordinates into the world coordinate system or transforms the coordinates into the view coordinate system, for example. The position of the vertex of the object (model) on the screen can be determined by the coordinate transformation section 10. The coordinate transformation section 10 may also perform coordinate transformation of the normal vector or the like in addition to the position coordinate transformation.

The lighting processing section 12 performs lighting processing (light source calculation) based on the normal vector of the object and an illumination model. The lighting processing is performed using the attribute parameter of the light source (color, brightness, and type of the light source), the parameter of the normal vector, the parameter (color and material) of the material for the object, and the like. As examples of the illumination model, various models can be given, such as a Lambertian illumination model taking only ambient light and diffused light into consideration, a Phong illumination model taking specular light into consideration in addition to ambient light and diffused light, and a Blinn illumination model.

The texture coordinate calculation section 14 performs texture coordinate calculation (calculation and acquisition) processing. In more detail, the texture coordinate calculation section 14 subjects the normal vector of the vertex to coordinate transformation to calculate the texture coordinates of the vertex, for example.

A rasterization processing section 123 performs rasterization (scan line conversion) processing. In more detail, processed vertex data is input to the rasterization processing section 123 from the vertex processing section 122. The rasterization processing section 123 generates the pixels forming the polygon based on the processed vertex data. In this case, various parameters included in the vertex data such as the vertex position, the vertex color, the vertex texture coordinates, and the vertex normal vector are interpolated (e.g. linear interpolation), and the pixel position, the pixel color, the pixel texture coordinates, and the pixel normal vector are calculated.

The pixel processing section 124 includes a texture mapping section 20 and a pixel processing section 22. The texture mapping section 20 performs texture mapping (sampling). The term "texture mapping" refers to processing for mapping (sampling) a texture (texel value) stored in a texture storage section 178 of the storage section 170. In more detail, the texture mapping section 20 reads the texture (surface properties such as color and alpha value) data from the texture storage section 178 using the pixel texture coordinates and maps the texture.

The pixel processing section 22 subjects the pixel data to various types of processing. The color of the pixel (fragment) is determined by the above processing. After the processing (pixel shader), the pixel processing section 22 performs a scissor test, an alpha test, a depth test, a stencil test, or the like to determine whether or not the pixel (fragment) is displayed. After the pixel processing section 22 has determined that the pixel is displayed, the pixel data is further processed (fog, translucent compositing, and anti-aliasing), and the processed pixel data is written into a frame buffer.

2.2 Assignment of Processing to Vertex Processing Section and Pixel Processing Section In this embodiment, when performing predetermined processing, assignment (distribution) of the processing to the vertex processing section 122 and the pixel processing section 124 is changed for each group (each object) to which the object belongs, thereby improving the efficiency of the processing.

Specifically, the pixel processing section 124 is caused to perform processing with a high load when processing an object (first object) of the first group, and the vertex processing section 122 is caused to perform processing with a high load when processing an object (second object) of the second group.

In more detail, when processing an object belonging to the first group, the vertex processing section 122 is caused to perform first processing with a low load, and the pixel processing section 124 is caused to perform second processing with a high load. The predetermined processing (e.g. light scattering, texture coordinate calculation, lighting, or color conversion) is realized by the first processing and the second processing. The term "object belonging to the first group" refers to a background object (e.g. distant view object such as mountain or map object such as a road or ground), an object of which the primitive plane (e.g. polygon) forming the object is larger than that of an object belonging to the second group, and the like.

On the other hand, when processing an object belonging to the second group, the vertex processing section 122 is caused to perform third processing with a high load, and the pixel processing section 124 is caused to perform fourth processing with a low load. The above predetermined processing is realized by the third processing and the fourth processing. The term "object belonging to the second group" refers to a moving object (e.g. car, train, airplane, ship, or character), an object of which the primitive plane forming the object is smaller than that of an object belonging to the first group, and the like.

The object belonging to the second group may be a stationary object (short view object) such as a building. Whether the primitive plane (polygon) is large or small may be determined by the area of the primitive plane, or may be determined by at least one of the width and the height of the primitive plane.

Figure 3:
FIG. 3 is a view illustrative of a method of assigning processing to the vertex processing section and the pixel processing section.

In FIG. 3, a moving object OBM is usually formed of a small polygon PLM (primitive plane in a broad sense; hereinafter the same), for example. The details of the shape of the moving object OBM can be represented by forming the moving object OBM using a number of small polygons, whereby the quality of the generated image can be increased. On the other hand, a background object OBB is usually formed of a large polygon PLB. The number of polygons making up the background object OBB can be reduced by forming the background object OBB using large polygons, whereby the processing load can be reduced. Moreover, even if the background object OBB is formed of a small number of large polygons, the quality of the generated image can be maintained by appropriately selecting the texture image mapped onto the polygon.

For example, consider the case of subjecting the background object OBB and the moving object OBM to predetermined processing such as light scattering described later. In this case, the polygon PLB forming the background object OBB is large. Therefore, if the vertex processing section 122 performs a high-load main processing (third processing) of the predetermined processing, the image quality may deteriorate. In FIG. 2, the data of each pixel is calculated by interpolating (linear interpolation) the data obtained for each vertex. Therefore, when the constituent polygon is large such as that of the background object OBB, if the vertex processing section 122 performs the main processing of the predetermined processing to interpolate the data of each vertex, the resulting pixel data may significantly differ from the correct results.

In this embodiment, when processing the background object OBB, the pixel processing section 124 performs the main processing (second processing) with a high processing load. This prevents a situation in which interpolation causes the pixel data to significantly differ from the correct results, whereby the quality of the generated image can be maintained.

On the other hand, the polygon PLM forming the moving object OBM is small. Therefore, even if the vertex processing section 122 performs the high-load main processing (third processing) of the predetermined processing, a situation rarely occurs in which the pixel data obtained by interpolating the vertex data significantly differs from the correct results.

In this embodiment, when processing the moving object OBM, the vertex processing section 122 performs the main processing (third processing) with a high processing load.

Figure 4A:
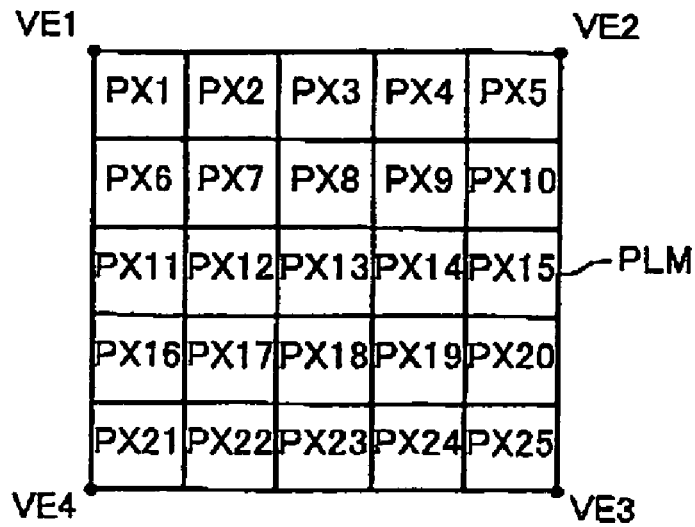
FIGS. 4A to 4C are views illustrative of an increase in processing efficiency using a method according to one embodiment of the invention.

As shown in FIG. 3, the moving object OBM is usually positioned near a virtual camera VC (view point). Therefore, the polygon PLM of the moving object OBM is usually large on the screen, as shown in FIG. 4A. In FIG. 4A, the number of vertices VE1 to VE4 is four, and the number of pixels PX1 to PX25 is 25, for example. Therefore, if the pixel processing section 124 performs the main portion of the predetermined processing, the processing load may be increased due to an increase in the number of processing operations.

In this embodiment, when processing the moving object OBM, the vertex processing section 122 performs the main processing (third processing) with a high processing load instead of the pixel processing section 124. This allows the number of processing operations of the main processing to be reduced to four in the example shown in FIG. 4A, whereby the processing load can be significantly reduced in comparison with the case where the pixel processing section 124 performs the main processing (i.e. the number of processing operations is 25).

Figure 4B:
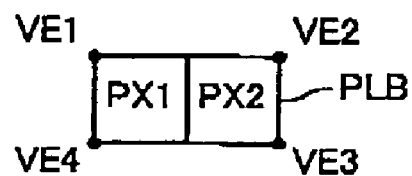
Figure 4C:
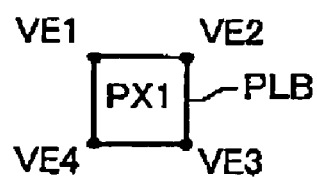

As shown in FIG. 3, the background object OBB is usually positioned away from the virtual camera VC. Therefore, the polygon PLB of the object OBB is usually small on the screen, as shown in FIGS. 4B and 4C. In FIG. 4B, the number of vertices VE1 to VE4 is four, and the number of pixels is two, for example. In FIG. 4C, the number of vertices VE1 to VE4 is four, and the number of pixels is one. Therefore, if the vertex processing section 122 performs the main portion of the predetermined processing, the processing load may be increased due to an increase in the number of processing operations.

In this embodiment, when processing the background object OBB, the pixel processing section 124 performs the main processing (second processing) with a high processing load instead of the vertex processing section 122. This allows the number of processing operations of the main processing to be reduced to two in the example shown in FIG. 4B and reduced to one in the example shown in FIG. 4C. Therefore, the processing load can be significantly reduced in comparison with the case where the vertex processing section 122 performs the main processing (i.e. the number of processing operations is four). The effect of reducing the processing load increases as the number of vertices of the background object OBB becomes larger.

Figure 5A:
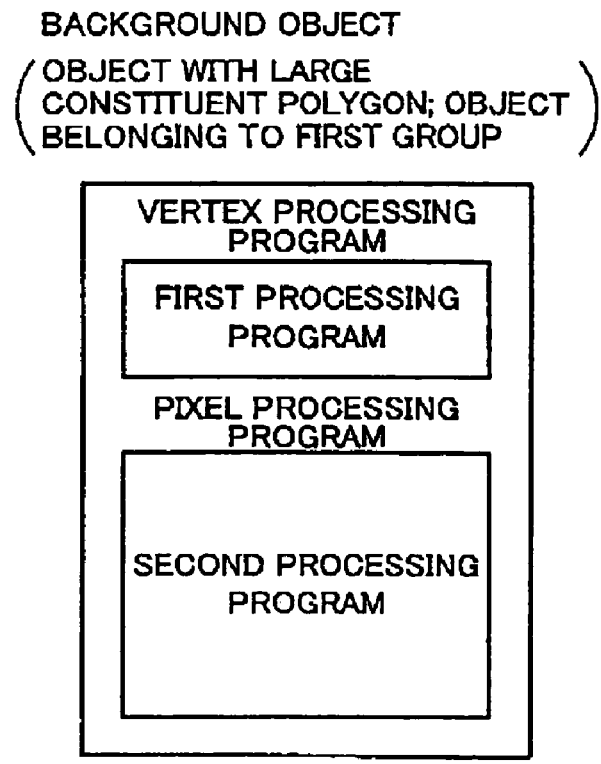
FIGS. 5A and 5B show program description examples for a background object and a moving object.

A specific method of implementing assignment of processing to the vertex processing section 122 and the pixel processing section 124 is described below. FIG. 5A shows a description example of a program (source program) for the background object (object with large constituent polygon; object belonging to first group; hereinafter the same), and FIG. 5B shows a description example of a program for the moving object (object with small constituent polygon; object belonging to second group; hereinafter the same).

The background object program shown in FIG. 5A includes a vertex processing program (vertex shader program) and a pixel processing program (pixel shader program). The function of the vertex processing section 122 shown in FIG. 2 is implemented by hardware such as a vector calculation unit and the vertex processing program executed by the hardware. The function of the pixel processing section 124 is implemented by hardware such as a vector calculation unit and the pixel processing program executed by the hardware. processing with a low processing load which makes up a first processing and a second processing which implement predetermined processing, and the pixel processing program includes a program for the second processing with a high processing load. As shown in FIG. 5A, a large number of functions and variables are described in the program for the second processing in comparison with the program for the first processing, so that the amount of description (number of steps) is large. Therefore, the processing load when the pixel processing section 124 executes the program for the second processing is greater than the processing load when the vertex processing section 122 executes the program for the first processing.

Figure 5B:
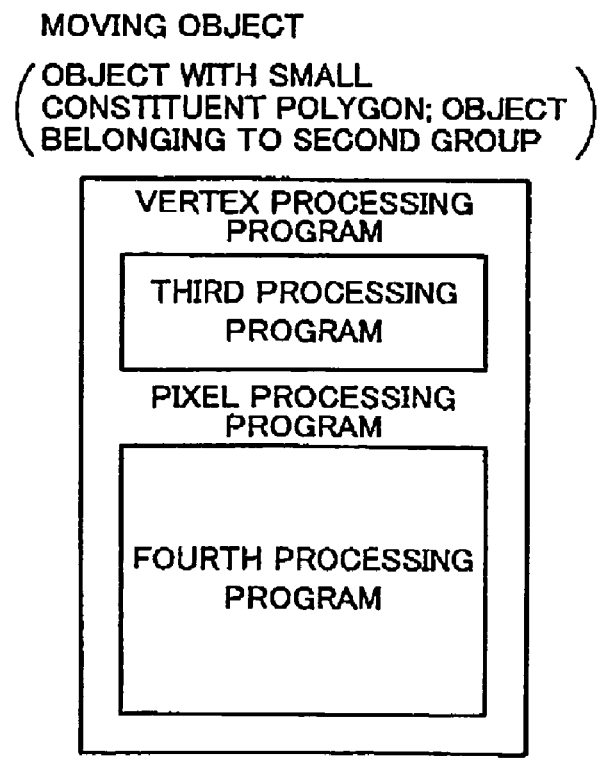

The moving object program shown in FIG. 5B also includes a vertex processing program (vertex shader program) and a pixel processing program (pixel shader program).

The vertex processing program shown in FIG. 5B includes a program for a third processing with a high processing load which makes up a third processing and a fourth processing which implement predetermined processing, and the pixel processing program includes a program for the fourth processing with a low processing load. As shown in FIG. 5B, a large number of functions and variables are described in the program for the third processing in comparison with the program for the fourth processing, so that the amount of description (number of steps) is large. Therefore, the processing load when the vertex processing section 122 executes the program for the third processing is greater than the processing load when the pixel processing section 124 executes the program for the fourth processing.

2.3 Light Scattering Processing

The predetermined processing implemented by the first processing and the second processing or the third processing and the fourth processing is described below. A case where the predetermined processing is light scattering processing (fog processing in a broad sense) is described first.

Light scattering is a phenomenon in which light is scattered due to atmospheric density fluctuations, particles in air, and the like. For example, sunlight is made up of light of seven colors. In the case of light scattering due to small particles, light of the color with a short wavelength is easily scattered, and light of the color with a long wavelength is scattered to only a small extent. In more detail, light of a color close to violet is easily scattered, and light of a color close to red is scattered to only a small extent.

The daytime sky looks blue because blue light contained in sunlight is scattered due to particles in the air to cover the sky and enters the observer's eyes. On the other hand, the sunset sky looks red because light from the setting sun travels a long distance in the air so that red light which is scattered to only a small extent due to particles in air enters the observer's eyes.

Figure 6A:
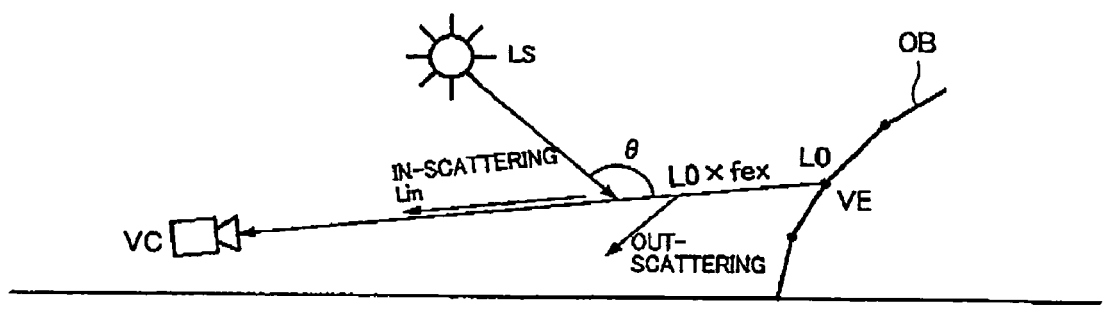
FIGS. 6A and 6B are views illustrative of light scattering processing.

In this embodiment, the light scattering phenomenon is represented by out-scattering and in-scattering models, as shown in FIG. 6A.

The out-scattering model is a model which represents a situation in which light is absorbed by air or scattered by particles to withdraw from the field of view (field of view of the virtual camera VC) so that the light attenuates. The in-scattering model is a model which represents a situation in which light from the sun LS (light source in a broad sense) enters the field of view so that the light is added.

In more detail, the light scattering model according to this embodiment is shown by the following expressions.

$$L = Lout + Lin \tag{1}$$

$$Lout = L0 \times fex \tag{2}$$

$$Lin = INT \times (1 - fex) \tag{3}$$

$$fex = e^{-(\beta R + \beta M)S} \tag{4}$$

-continued $$INT = \frac{\beta R(\theta) + \beta M(\theta)}{\beta R + \beta M} E \qquad (5)$$

$$\beta R(\theta) = \frac{3}{16\pi} \beta R(1 + \cos^2\theta) \qquad (6)$$

$$\beta M(\theta) = \frac{1}{4\pi} \beta M \frac{(1-g)^2}{(1+g^2 - 2g\cos\theta)^{\frac{3}{2}}} (1 + \cos^2\theta) \qquad (7)$$

In these expressions, Lout indicates the color (color component) formed by out-scattering, and Lin indicates the color (color component) formed by in-scattering. L0 indicates the input color. In more detail, L0 indicates the color of light (reflected light) from the vertex VE of the object OB (background object OBB or moving object OBM), as shown in FIG. 6A, for example. INT is a function indicating the intensity of light by in-scattering, and fex is a function indicating extinction.

S is a parameter of the distance between the virtual camera VC (view point) and the vertex VE; θ is a parameter of the angle formed by the line-of-sight direction of the virtual camera VC and the direction of light from the light source LS; E is a parameter of the intensity of light from the sun LS; BR is a Rayleigh coefficient which is a parameter indicating the density of air; BM is an MIE coefficient which is a parameter of the density of dust in air; and g is a parameter indicating the degree to which dust in air scatters light.

Figure 6B:
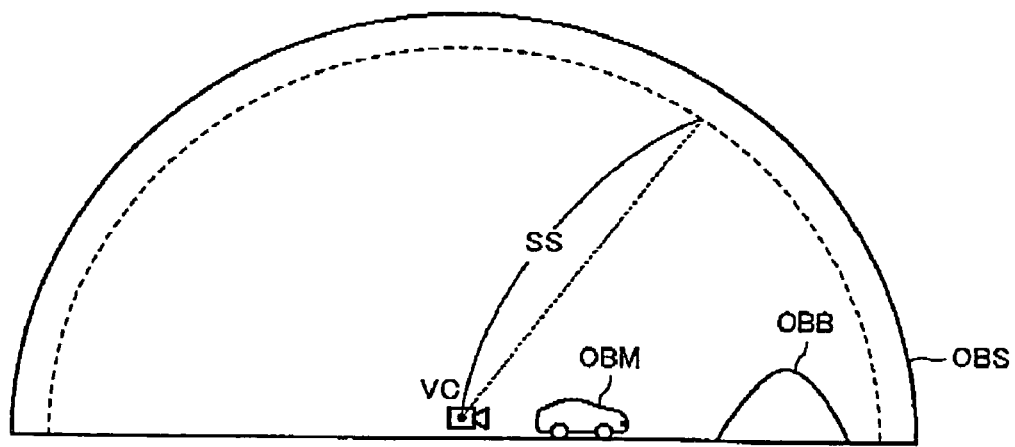

In this embodiment, an object (vertex) positioned at a specific distance SS from the virtual camera VC (view point) is not subjected to the light scattering processing, as shown in FIG. 6B. For example, a sky picture is drawn on a celestial sphere object OBS. The sky picture is usually a picture drawn by a CG designer taking light scattering into consideration. Therefore, if the sky portion of the celestial sphere object OBS is subjected to the light scattering processing according to this embodiment, a situation occurs in which the light scattering effects are provided twice.

On the other hand, occurrence of such a situation can be prevented by not subjecting the object positioned at the specific distance SS from the virtual camera VC to the light scattering processing, as shown in FIG. 6B, whereby the quality of the generated image can be improved.

The light scattering processing according to this embodiment is described below using flowcharts shown in FIGS. 7 and 8.

Figure 7:
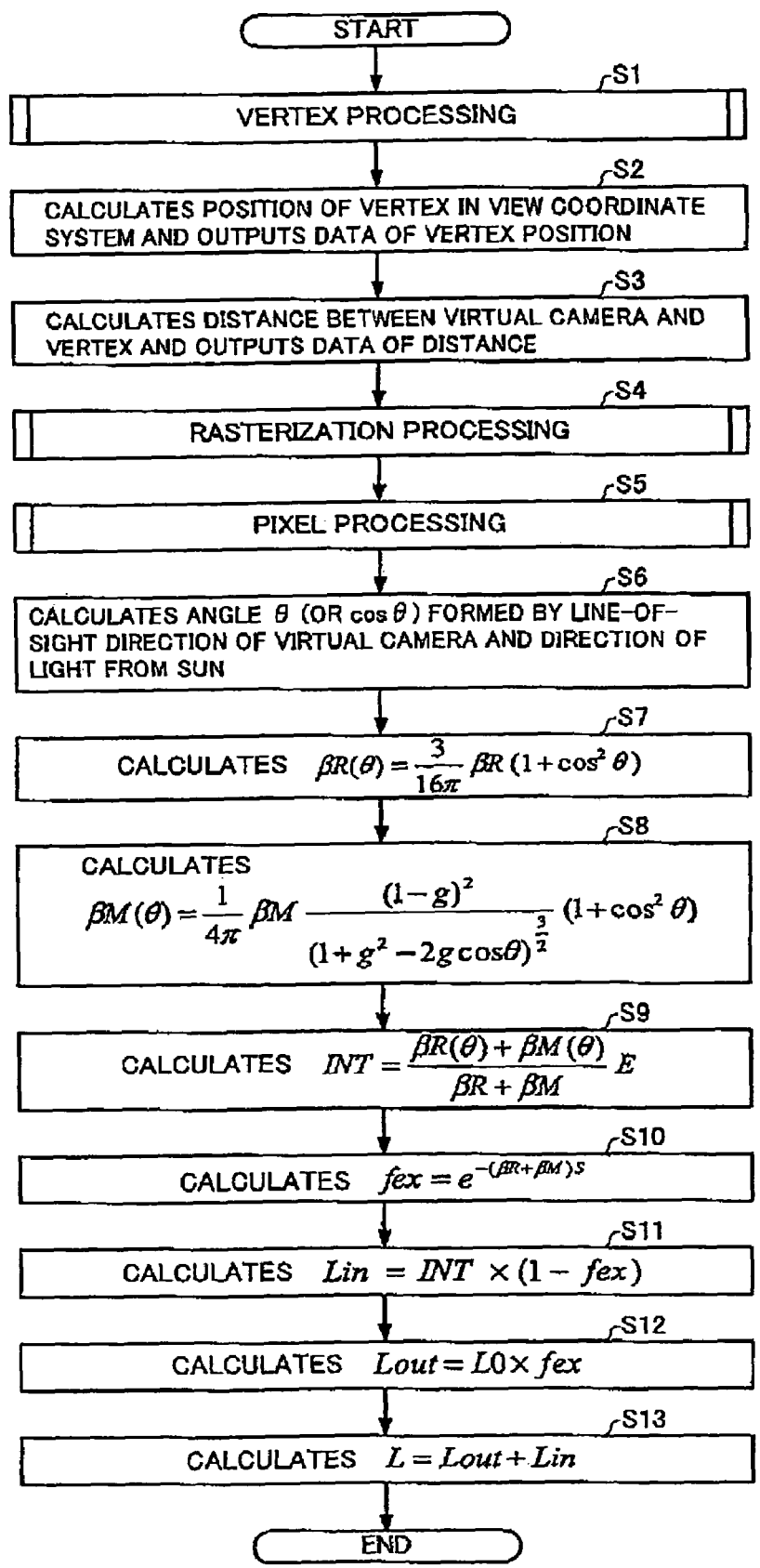
FIG. 7 is a flowchart of light scattering processing of a background object.

FIG. 7 shows a flowchart of the light scattering processing (predetermined processing in a broad sense) performed for the background object OBB. The vertex processing section 122 performs vertex processing (step S1). The vertex processing is a first processing with a low load, as shown in FIG. 5A. The vertex processing is performed for each vertex forming the background object OBB.

In the vertex processing, the position of the vertex in the view (camera) coordinate system is calculated, and the data of the calculated vertex position is output (step S2). For example, the data is output to a vertex buffer (output register) as vertex data. The distance S between the virtual camera and the vertex is calculated based on the calculated vertex position, and the data of the calculated distance is output (step S3). The vertex processing is thus completed.

After the vertex processing has been completed, the rasterization processing section 123 performs rasterization processing (step S4). In the rasterization processing, interpolation calculations of the vertex position, the vertex color, and the like are performed. The distance between the virtual camera and the vertex calculated in the step S3 is also subjected to interpolation calculation.

After the rasterization processing has been completed, the pixel processing section 124 performs pixel processing (step S5). The pixel processing is a second processing with a high load, as shown in FIG. 5A. The pixel processing is performed for each pixel (fragment) forming the screen.

In the pixel processing, the angle θ formed by the line-of-sight direction of the virtual camera and the direction of light from the sun is calculated (step S6). Note that cosθ may be directly calculated instead of the angle θ. The line-of-sight direction of the virtual camera may be calculated based on the position of the virtual camera and the position of the point obtained by interpolating the vertex position by the rasterization processing in the step S4.

The βR(θ) and BM(θ) shown in the expressions (6) and (7) are calculated based on θ (cosθ) obtained in the step S6 (steps S7 and S8). The intensity INT of light by in-scattering shown in the expression (5) is calculated based on the calculated βR(θ) and BM(θ) (step S9).

The function fex shown in the expression (4) is then calculated based on the distance S (step S10). The distance S may be calculated based on the position of the virtual camera and the position of the point obtained by interpolating the vertex position by the rasterization processing in the step S4.

The color Lin of light by in-scattering shown in the expression (3) is calculated (step S11). The color Lout of light by out-scattering shown in the expression (2) is also calculated (step S12). The colors Lout and Lin are added as shown by the expression (1), and the final color L (pixel color) of light subjected to scattering is calculated (step S13).

Figure 8:
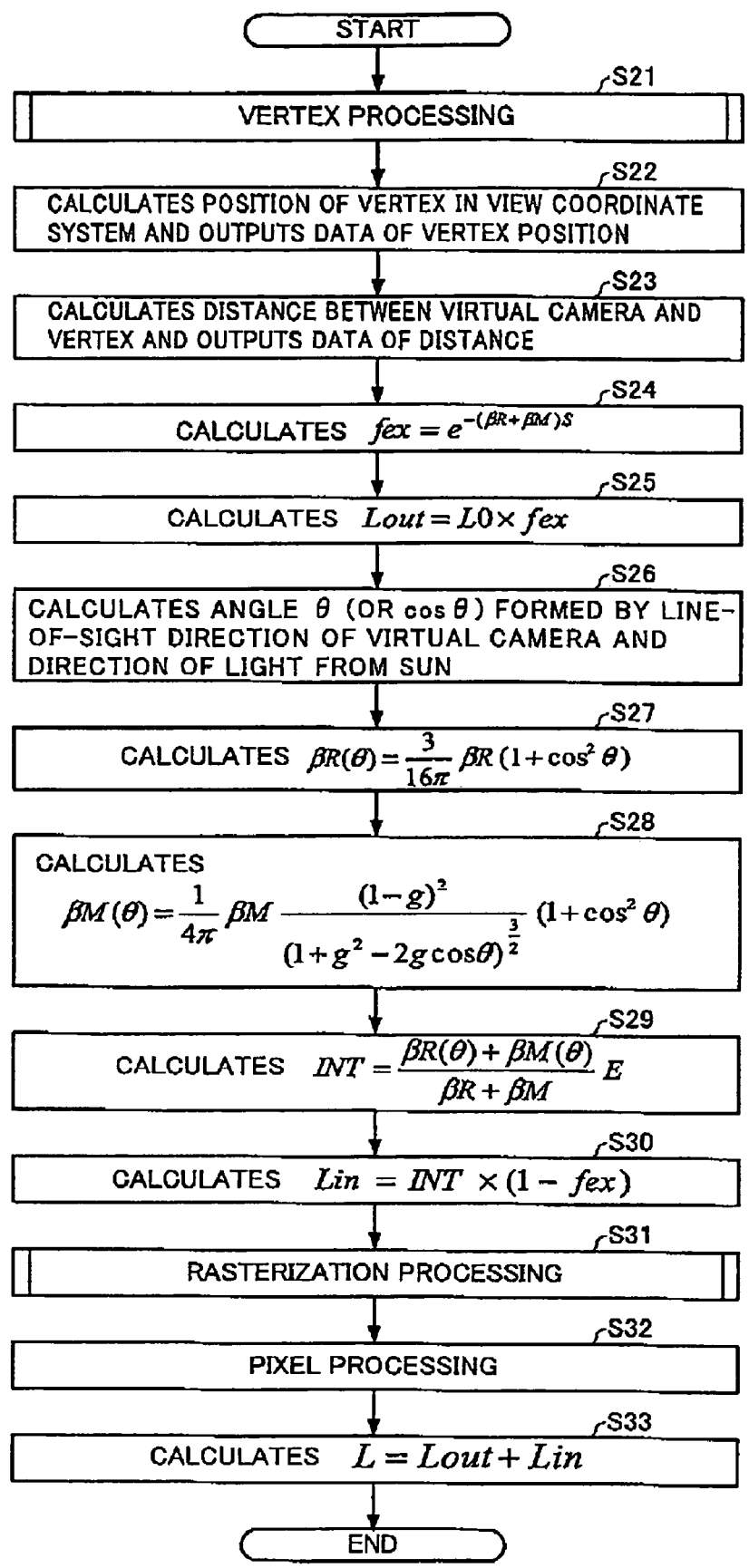
FIG. 8 is a flowchart of light scattering processing of a moving object.

FIG. 8 shows a flowchart of the light scattering processing performed for the moving object OBM. The vertex processing section 122 performs the vertex processing (step S21). The vertex processing is a third processing with a high load, as shown in FIG. 5B. The vertex processing is performed for each vertex forming the moving object OBM.

In the vertex processing, the position of the vertex in the view coordinate system is calculated, and the data of the calculated vertex position is output (step S22). The distance S between the virtual camera and the vertex is calculated based on the calculated vertex position, and the data of the calculated distance is output (step S23).

Based on the distance S calculated in the step S23, fex shown in the expression (4) is then calculated (step S24). The color Lout (vertex color) of light by out-scattering shown in the expression (2) is also calculated (step S25).

The angle θ formed by the line-of-sight direction of the virtual camera and the direction of light from the sun is calculated (step S26). Note that cosθ may be directly calculated instead of the angle θ. The line-of-sight direction of the virtual camera may be calculated based on the position of the virtual camera and the vertex position calculated in the step S22.

The βR(θ) and BM(θ) shown in the expressions (6) and (7) are calculated based on θ (cosθ) obtained in the step S26 (steps S27 and S28). The intensity INT of light by in-scattering shown in the expression (5) is calculated based on the calculated βR(θ) and BM(θ) (step S29). The color Lin (vertex color) of light by in-scattering shown in the expression (3) is calculated (step S30). The vertex processing is thus completed.

After the vertex processing has been completed, the rasterization processing section 123 performs rasterization processing (step S31). In the rasterization processing, the color Lout calculated in the step S25 and the color Lin calculated in the step S30 are subjected to interpolation calculations.

After the rasterization processing has been completed, the pixel processing section 124 performs pixel processing (step S32). The pixel processing is a fourth processing with a low load, as shown in FIG. 5B. The pixel processing is performed for each pixel (fragment) forming the screen.

In the pixel processing, the color Lout (pixel color) of light by out-scattering and the color Lin (pixel color) of light by in-scattering are added, and the final color L (pixel color) of light subjected to scattering is calculated (step S33). The colors Lout and Lin subjected to interpolation calculations in the rasterization processing in the step S31 are used.

As shown in FIG. 7, when subjecting the background object to the light scattering processing, the load of the first processing (i.e. vertex processing) (steps S2 and S3) is low, and the load of the second processing (i.e. pixel processing) (steps S6 to S13) is high. When subjecting the background object to the light scattering processing, the number of pixel processing operations is usually smaller than the number of vertex processing operations, as shown in FIGS. 4B and 4C. Therefore, the entire processing load can be reduced by the method shown in FIG. 7.

As shown in FIG. 8, when subjecting the moving object to the light scattering processing, the load of the third processing (i.e. vertex processing) (steps S22 to S30) is high, and the load of the fourth processing (i.e. pixel processing) (step S33) is low. When subjecting the moving object to the light scattering processing, the number of vertex processing operations is usually smaller than the number of pixel processing operations, as shown in FIG. 4A. Therefore, the entire processing load can be reduced by the method shown in FIG. 8.

2.4 Texture Coordinate Calculation Processing

A case where the predetermined processing is texture coordinate calculation (derivation) processing is described below. In environment mapping such as sphere environment mapping, the texture coordinates are calculated, and a texture is mapped (sampled) using the calculated texture coordinates to represent reflection of the surrounding environment on the object. The method according to this embodiment may be applied to such texture coordinate calculation processing.

Figure 9:
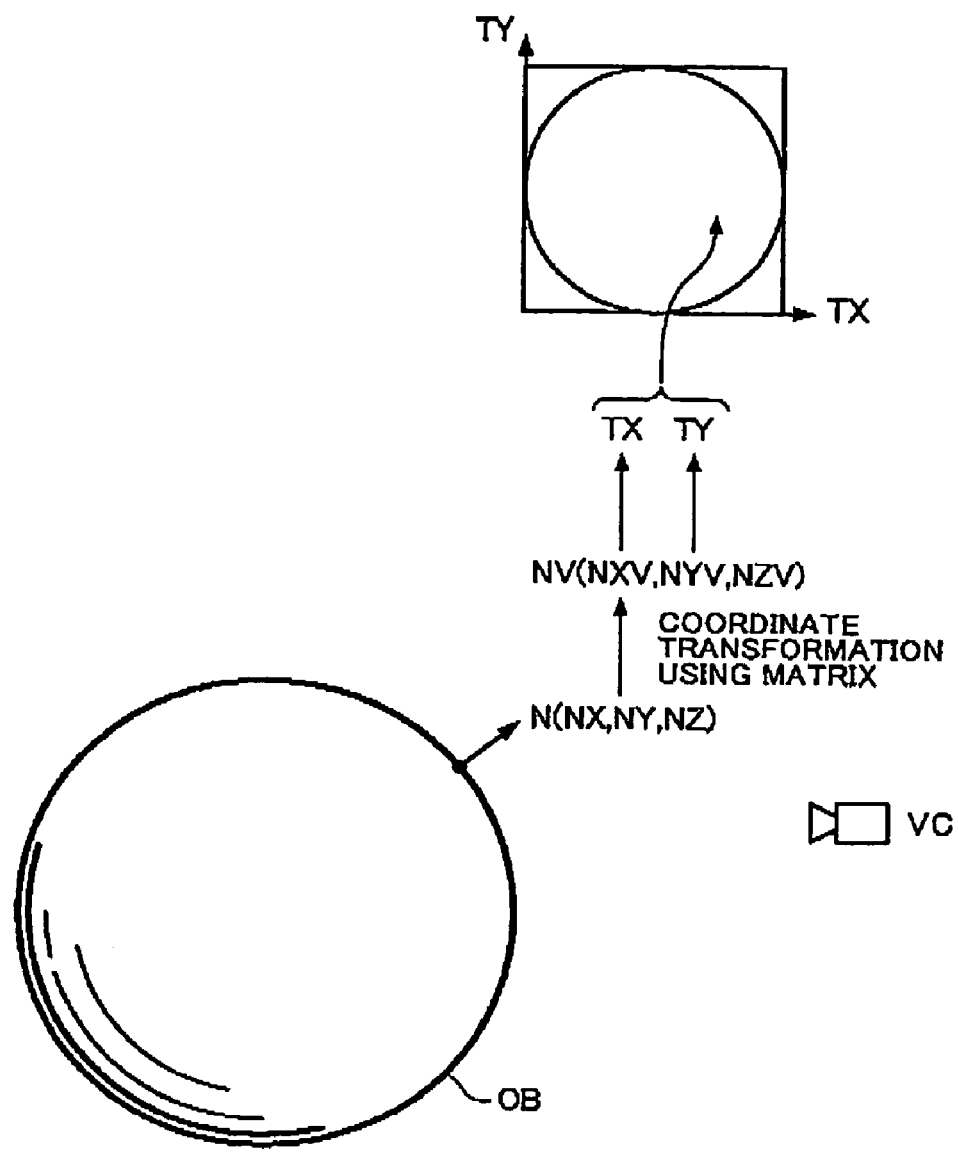
FIG. 9 is a view illustrative of texture coordinate calculation processing.

In FIG. 9, N(NX, NY, NZ) indicates the normal vector of the object OB. In this case, the normal vector N(NX, NY, NZ) is subjected to coordinate transformation to determine the normal vector NV(NXV, NYV, NZV) after the coordinate transformation. As the coordinate transformation, transformation into the view coordinate system using the view matrix of the virtual camera VC and the like can be given. Note that the coordinate transformation according to this embodiment is not limited to transformation into the view coordinate system.

The texture coordinates TX and TY (U and V coordinates) are calculated based on the coordinates NXV and NYV of the normal vector NV after the coordinate transformation. An environment texture is read using the calculated texture coordinates TX and TY, and mapped onto the object OB. This allows a realistic image to be generated in which the surrounding environment is reflected on the object OB. The environment mapping to which the texture coordinate calculation method according to this embodiment may be applied is not limited to sphere environment mapping, and may be another environment mapping method. The texture coordinate calculation method according to this embodiment may be applied to mapping other than environment mapping.

The texture coordinate calculation processing according to this embodiment is described below using flowcharts shown in FIGS. 10 and 11.

Figure 10:
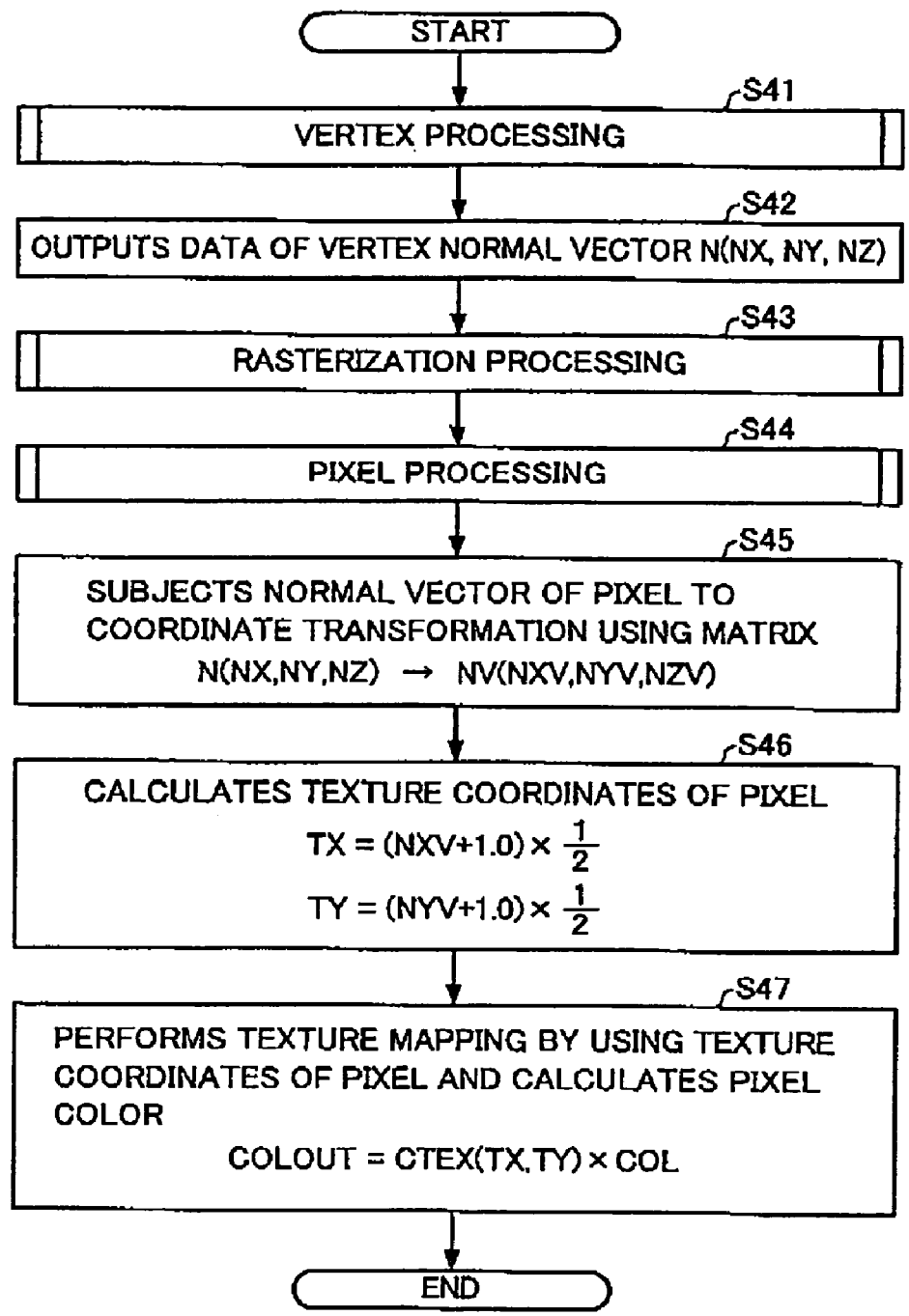
FIG. 10 is a flowchart of texture coordinate calculation processing of a background object.

FIG. 10 shows a flowchart of the texture coordinate calculation processing (predetermined processing in a broad sense) performed for the background object OBB.

The vertex processing section 122 performs the vertex processing (step S41). The vertex processing is a first processing with a low load, as shown in FIG. 5A. In the vertex processing, the data of the vertex normal vector N(NX, NY, NZ) is output (step S42).

After the vertex processing has been completed, the rasterization processing section 123 performs rasterization processing (step S43). In the rasterization processing, interpolation calculations of the vertex position, the vertex color, and the like are performed. The vertex normal vector calculated in the step S42 is also subjected to interpolation calculation (linear interpolation).

After the rasterization processing has been completed, the pixel processing section 124 performs pixel processing (step S44). The pixel processing is a second processing with a high load, as shown in FIG. 5A.

In the pixel processing, the normal vector N(NX, NY, NZ) of the pixel (fragment) is subjected to coordinate transformation using the matrix (step S45). For example, the normal vector N(NX, NY, NZ) is subjected to coordinate transformation into the view coordinate system to determine the normal vector NV(NXV, NYV, NZV) of the pixel after the coordinate transformation. The texture coordinates TX and TY of the pixel are calculated based on the coordinates NXV and NYV of the normal vector NV (step S46). In more detail, the texture coordinates TX and TY are calculated according to the following expressions (8) and (9).

$$TX=(NXV+1.0)/2 \quad (8)$$

$$TY=(NYV+1.0)/2 \quad (9)$$

The calculations shown by the expressions (8) and (9) are performed because the range of the texture coordinates TX and TY is 0.0 to 1.0 and the range of the coordinates NTX and NTY is −1.0 to 1.0.

Texture mapping (texture sampling) is performed based on the calculated texture coordinates of the pixel, and the pixel color is calculated (step S47). In more detail, the final pixel color COLOUT is calculated according to the following expression (10).

$$COLOUT=CTEX(TX, TY) \times COL \quad (10)$$

In the expression (10), CTEX (TX, TY) is the color read from the texture storage section 178 based on the texture coordinates, and COL is the original color (underlayer color) of the background object OBB.

Figure 11:
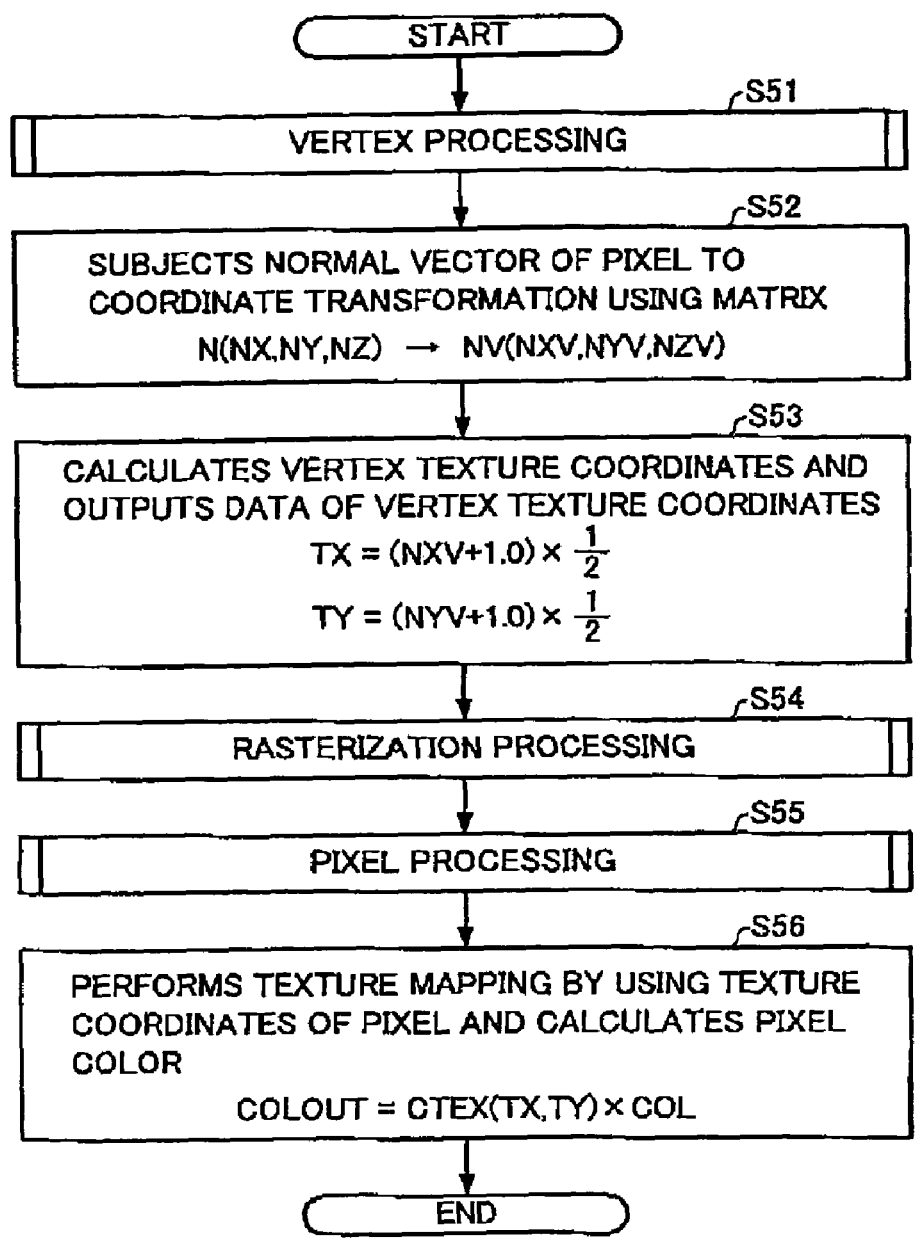
FIG. 11 is a flowchart of texture coordinate calculation processing of a moving object.

FIG. 11 shows a flowchart of the texture coordinate calculation processing performed for the moving object OBM.

The vertex processing section 122 performs vertex processing (step S51). The vertex processing is a third processing with a high load, as shown in FIG. 5B.

In the vertex processing, the vertex normal vector N (NX, NY, NZ) is subjected to coordinate transformation using the matrix (step S52). For example, the normal vector N (NX NY, NZ) is subjected to coordinate transformation into the view coordinate system to determine the vertex normal vector NV (NXV, NYV, NZV) after the coordinate transformation. The vertex texture coordinates TX and TY are calculated based on the coordinates NXV and NYV of the normal vector NV (step S53). In more detail, the texture coordinates TX and TY are calculated according to the above expressions (8) and (9). The vertex processing is thus completed.

After the vertex processing has been completed, the rasterization processing section 123 performs rasterization processing (step S54). In the rasterization processing, interpolation calculations of the vertex position, the vertex color, and the like are performed. The vertex texture coordinates calculated in the step S53 is also subjected to interpolation calculation (linear interpolation).

After the rasterization processing has been completed, the pixel processing section 124 performs pixel processing (step S55). The pixel processing is a fourth processing with a low load, as shown in FIG. 5B. Specifically, texture mapping (texture sampling) is performed based on the texture coordinates of the pixel, and the pixel color CLOUT is calculated according to the above expression (10) (step S56).

As shown in FIG. 10, when subjecting the background object to the texture coordinate calculation processing, the load of the first processing (i.e. vertex processing) (step S42) is low, and the load of the second processing (i.e. pixel processing) (steps S45 to S47) is high. When subjecting the background object to the texture coordinate calculation processing, since the number of pixel processing operations is usually smaller than the number of vertex processing operations, as shown in FIGS. 4B and 4C, the entire processing load can be reduced.

As shown in FIG. 11, when subjecting the moving object to the texture coordinate calculation processing, the load of the third processing (i.e. vertex processing) (steps S52 and S53) is high, and the load of the fourth processing (i.e. pixel processing) (step S56) is low. When subjecting the moving object to the texture coordinate calculation processing, since the number of vertex processing operations is usually smaller than the number of pixel processing operations, as shown in FIG. 4A, the entire processing load can be reduced.

2.5 Lighting Processing

Figure 12A:
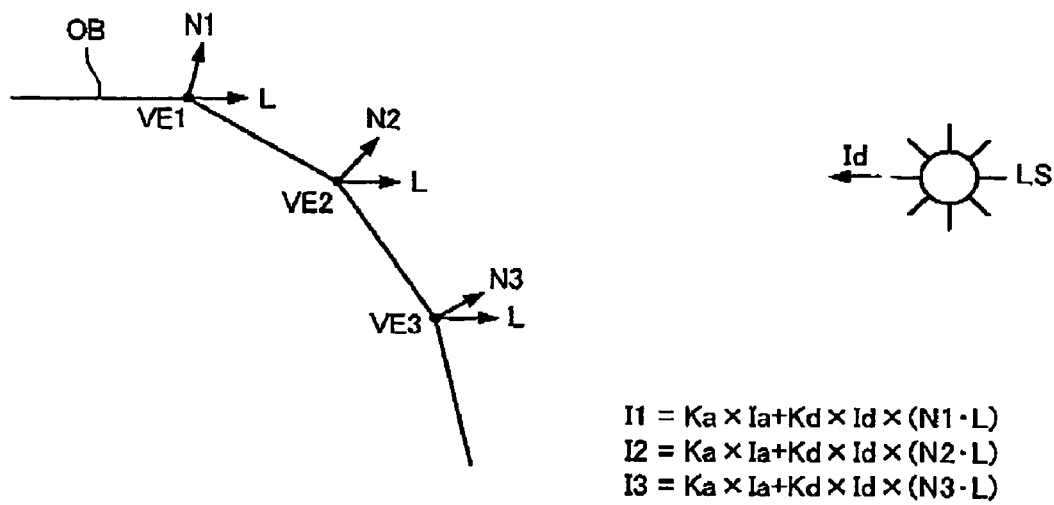
FIGS. 12A and 12B are views illustrative of lighting processing.

A case where the predetermined processing is lighting (light source calculation) processing is described below. As a mathematical model for simulating a lighting phenomenon in the real world, various illumination models are used in this type of image generation system. As a typical illumination model when the light source is parallel light, a Lambertian illumination model shown in FIG. 12A and the following expressions (11), (12), and (13) is known.

$$I1 = Ka \times Ia + Kd \times Id \times (N1 \cdot L) \quad (11)$$

$$I2 = Ka \times Ia + Kd \times Id \times (N2 \cdot L) \quad (12)$$

$$I3 = Ka \times Ia + Kd \times Id \times (N3 \cdot L) \quad (13)$$

I1, I2, and I3 are the intensities of light at the vertices VE1, VE2, and VE3, Ka is the ambient light reflection coefficient, and Ia is the intensity of ambient light. Kd is the diffuse reflection coefficient for light from the light source LS, and Id is the intensity of light from the light source LS. N1, N2, and N3 are the normal vectors of the vertices VE1, VE2, and VE3, and L is the direction vector of light from the light source LS.

Figure 12B:
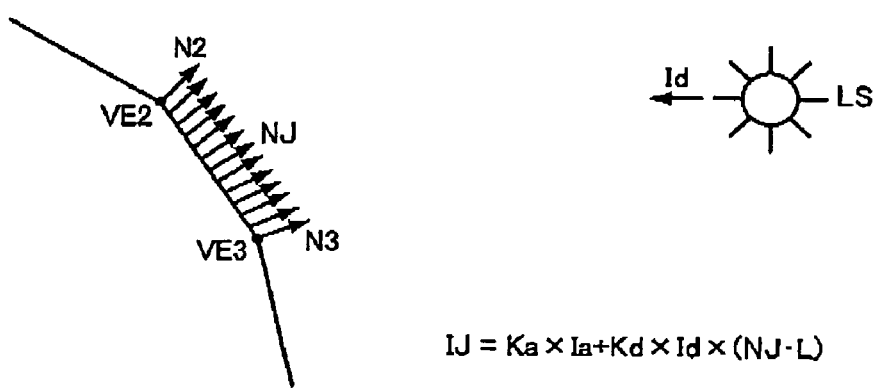

In FIG. 12B, the normal vector N2 of the vertex VE2 and the normal vector N3 of the vertex VE3 is subjected to interpolation processing (linear interpolation) to determine the normal vector NJ of each pixel. The interpolation processing of the normal vectors is performed by the rasterization processing section 123 shown in FIG. 2. The light intensity IJ at each pixel is calculated based on the determined normal vector NJ according to the following expression (14).

$$IJ = Ka \times Ia + Kd \times Id \times (NJ \cdot L) \quad (14)$$

The method according to this embodiment may be applied to the lighting processing using the above-described illumination model. The illumination model to which the method according to this embodiment may be applied is not limited to the Lambertian illumination model, and may be a Phong illumination model taking specular light into consideration, a Blinn illumination model, or another illumination model.

The lighting processing according to this embodiment is described below using flowcharts shown in FIGS. 13 and 14.

Figure 13:
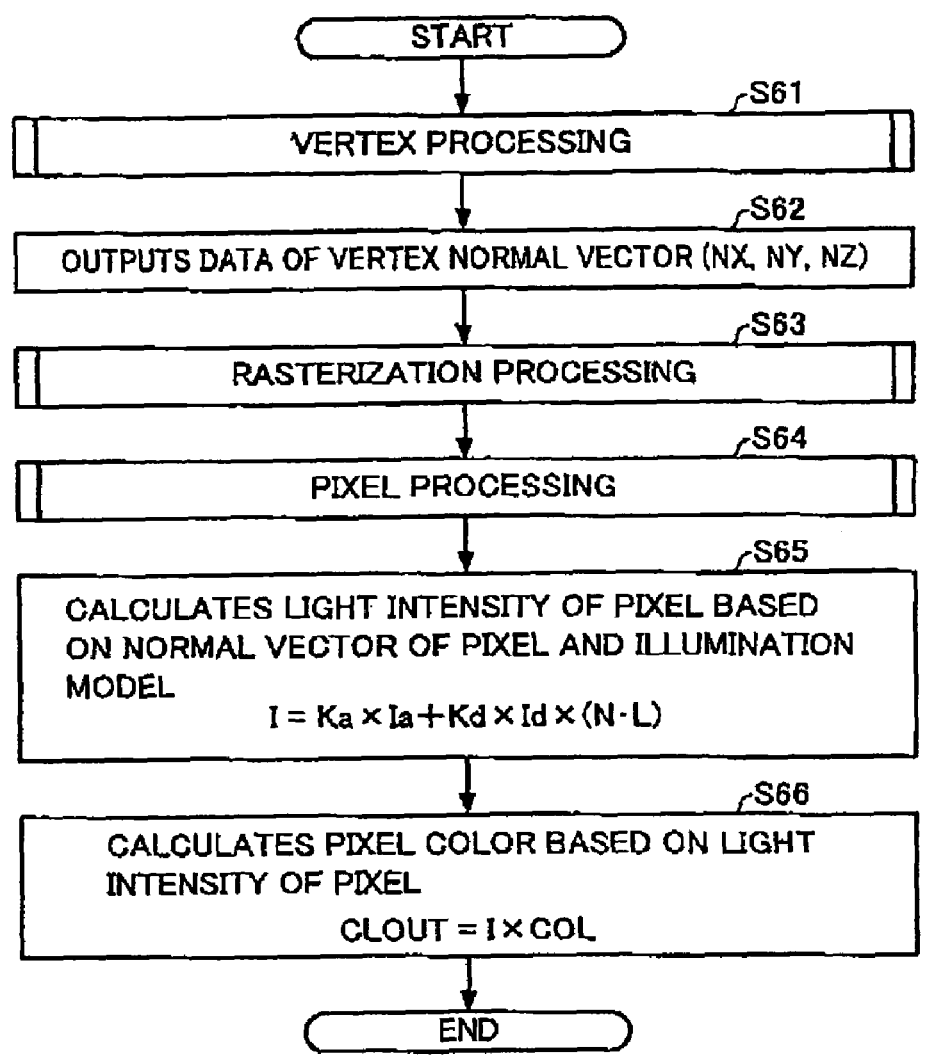
FIG. 13 is a flowchart of lighting processing of a background object.

FIG. 13 shows a flowchart of the lighting processing (predetermined processing in a broad sense) performed for the background object OBB.

The vertex processing section 122 performs the vertex processing (step S61). The vertex processing is a first processing with a low load, as shown in FIG. 5A. In the vertex processing, the data of the normal vector N(NX, NY, NZ) of the vertex is output (step S62).

After the vertex processing has been completed, the rasterization processing section 123 performs rasterization processing (step S63). In the rasterization processing, interpolation calculations of the vertex position, the vertex color, and the like are performed. The vertex normal vector calculated in the step S62 is also subjected to interpolation calculation (linear interpolation).

After the rasterization processing has been completed, the pixel processing section 124 performs pixel processing (step S64). The pixel processing is a second processing with a high load, as shown in FIG. 5A.

In the pixel processing, the light intensity I of the pixel is calculated based on the normal vector N (NX, NY, NZ) of the pixel (fragment) and the illumination model shown by the above expression (14) (step S65). The pixel color CLOUT is calculated based on the calculated light intensity I according to the following expression (15) (step S66).

$$CLOUT = I \times COL \quad (15)$$

COL is the original color (underlayer color) of the background object OBB.

Figure 14:
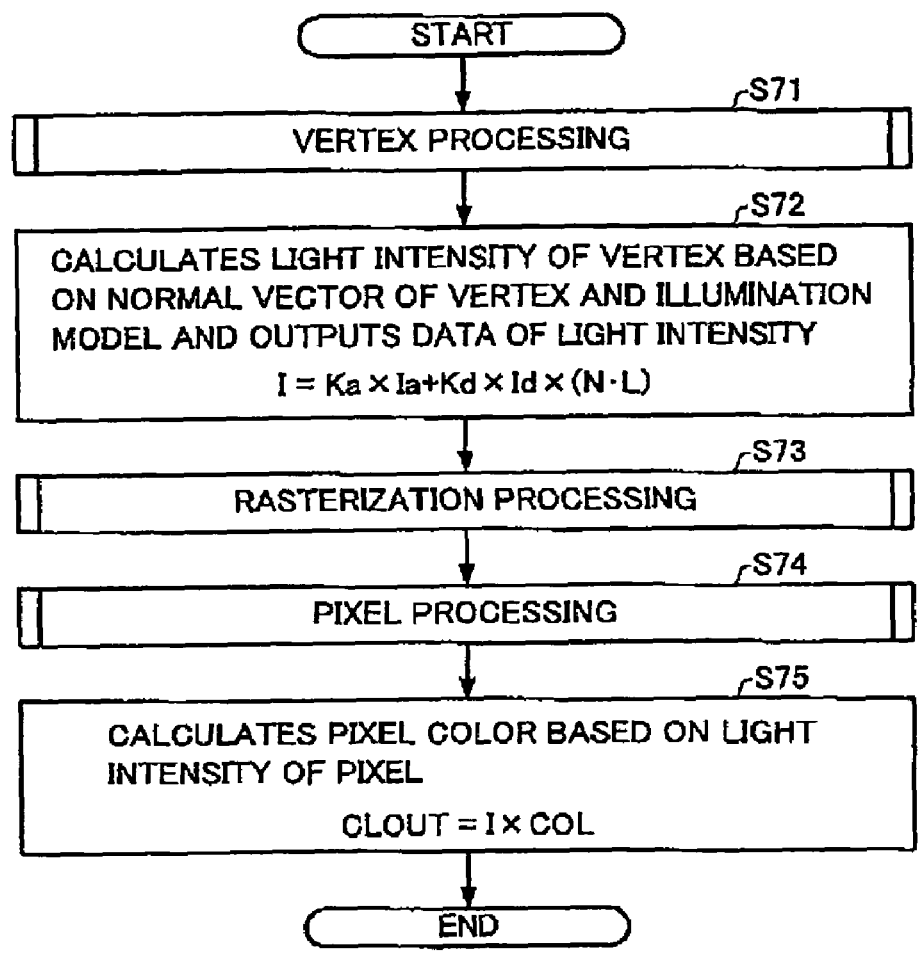
FIG. 14 is a flowchart of lighting processing of a moving object.

FIG. 14 shows a flowchart of the lighting processing performed for the moving object OBM.

The vertex processing section 122 performs vertex processing (step S71). The vertex processing is a third processing with a high load, as shown in FIG. 5B.

In the vertex processing, the light intensity I of the vertex is calculated based on the normal vector N (NX, NY, NZ) of the vertex and the illumination model shown by the above expressions (11), (12), and (13), and the data of the light intensity is output (step S72). The vertex processing is thus completed.

After the vertex processing has been completed, the rasterization processing section 123 performs rasterization processing (step S73). In the rasterization processing, interpolation calculations of the vertex position, the vertex color, and the like are performed. The light intensity calculated in the step S72 is also subjected to interpolation calculation (linear interpolation).

After the rasterization processing has been completed, the pixel processing section 124 performs pixel processing (step S74). The pixel processing is a fourth processing with a low load, as shown in FIG. 5B. Specifically, the pixel color is calculated based on the light intensity of the pixel according to the above expression (15) (step S75).

As shown in FIG. 13, when subjecting the background object to the lighting processing, the load of the first processing (i.e. vertex processing) (step S62) is low, and the load of the second processing (i.e. pixel processing) (steps S65 and S66) is high. When subjecting the background object to the lighting processing, since the number of pixel processing operations is usually smaller than the number of vertex processing operations, as shown in FIGS. 4B and 4C, the entire processing load can be reduced.

As shown in FIG. 14, when subjecting the moving object to the lighting processing, the load of the third processing (i.e. vertex processing) (step S72) is high, and the load of the fourth processing (i.e. pixel processing) (step S75) is low. When subjecting the moving object to the lighting processing, since the number of vertex processing operations is usually smaller than the number of pixel processing operations, as shown in FIG. 4A, the entire processing load can be reduced.

2.6 Color Conversion Processing

Figure 15A:
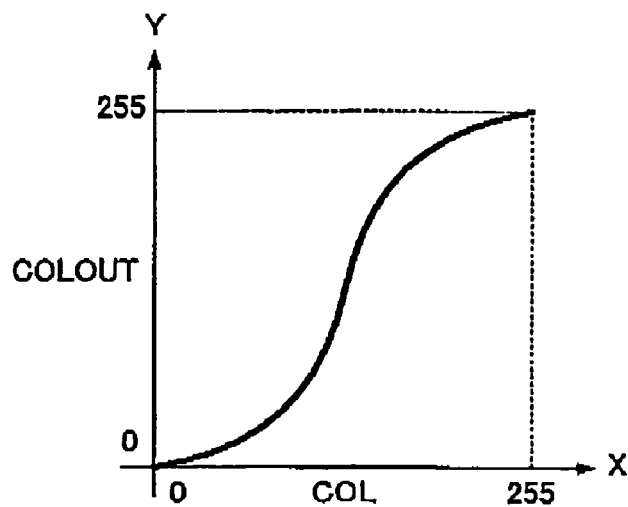
FIGS. 15A to 15C are views illustrative of color conversion processing.
Figure 15B:
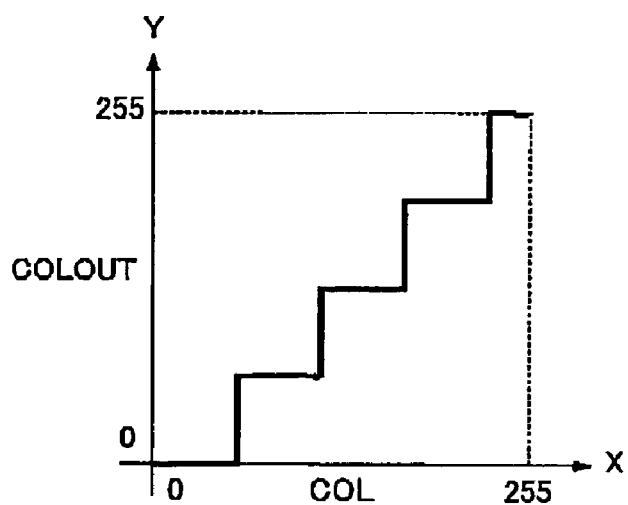
Figure 15C:
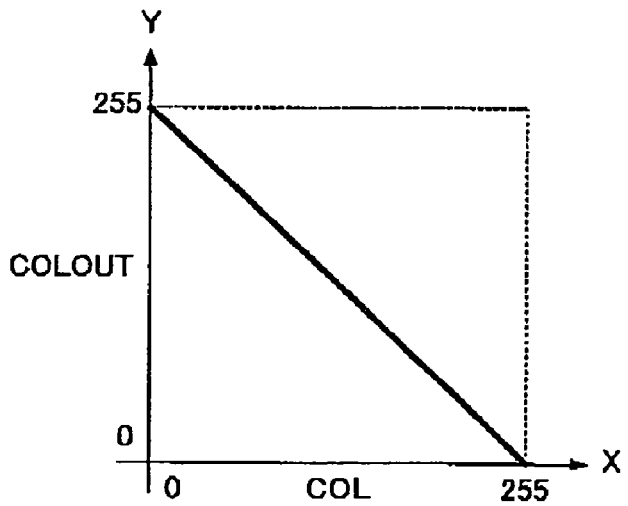

A case where the predetermined processing is color conversion processing is described below. In this type of image generation system, it is desirable to subject an image to conversion called gamma correction in order to correct the nonlinear characteristics of the display section (monitor). FIG. 15A shows an example of the gamma correction conversion characteristics. The color conversion processing for gamma correction or the like is generally implemented by post-filter processing. This embodiment employs a method of performing color conversion processing for gamma correction or the like during rendering. Note that the color conversion processing to which the method according to this embodiment is applied is not limited to gamma correction shown in FIG. 15A. The method according to this embodiment may be applied to various types of conversion processing as shown in FIGS. 15B and 15C. FIG. 15B shows an example of posterization conversion processing, and FIG. 15C shows an example of negative/positive conversion processing.

The color conversion processing according to this embodiment is described below using flowcharts shown in FIGS. 16 and 17.

Figure 16:
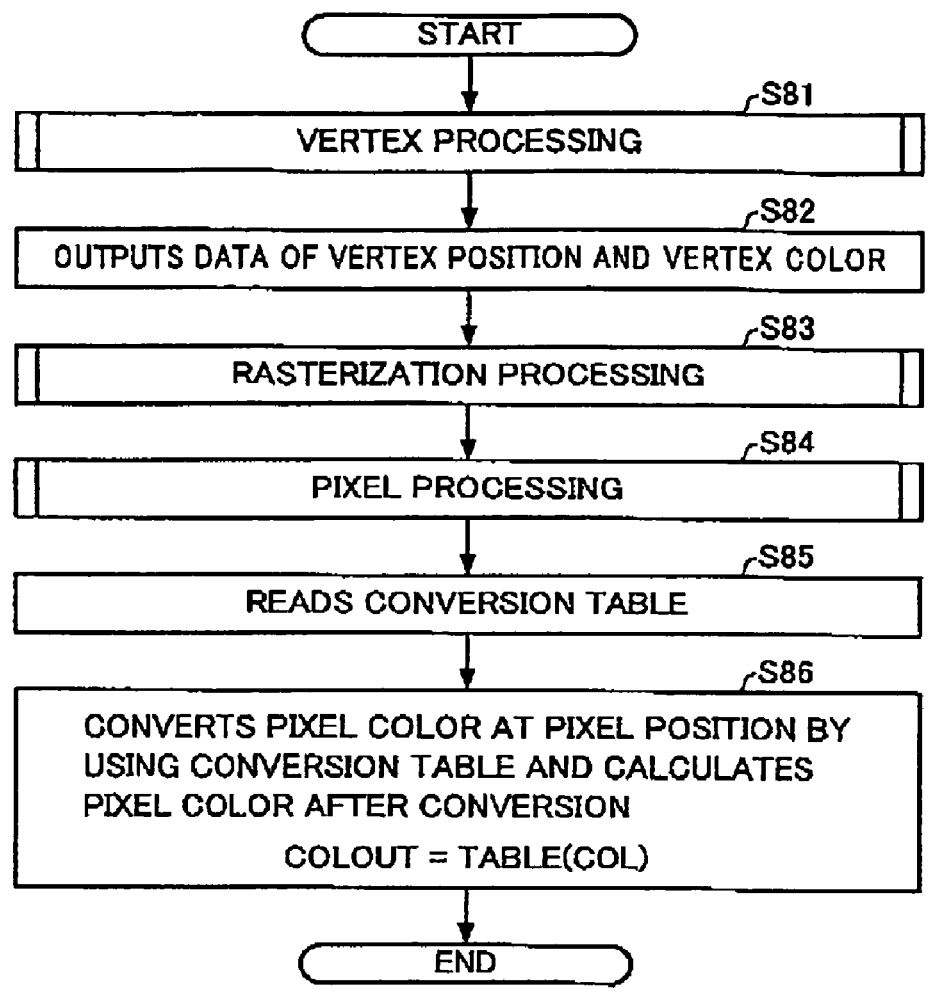
FIG. 16 is a flowchart of color conversion processing of a background object.

FIG. 16 shows a flowchart of the color conversion processing (predetermined processing in a broad sense) performed for the background object OBB.

The vertex processing section 122 performs vertex processing (step S81). The vertex processing is a first processing with a low load, as shown in FIG. 5A. In the vertex processing, the data of the vertex position and the vertex color is output (step S82).

After the vertex processing has been completed, the rasterization processing section 123 performs rasterization processing (step S83). In the rasterization processing, interpolation calculations of the vertex position, the vertex color, and the like are performed.

After the rasterization processing has been completed, the pixel processing section 124 performs pixel processing (step S84). The pixel processing is a second processing with a high load, as shown in FIG. 5A.

In the pixel processing, a conversion table (or conversion function) for the color conversion processing is read (step S85). The pixel color at the pixel position is converted using the conversion table (or conversion function), and the pixel color CLOUT after conversion is calculated according to the following expression (16) (step S86).

$$CLOUT=TABLE(COL) \quad (16)$$

COL is the original color before conversion, and TABLE (COL) is the color obtained by conversion using the conversion table.

Figure 17:
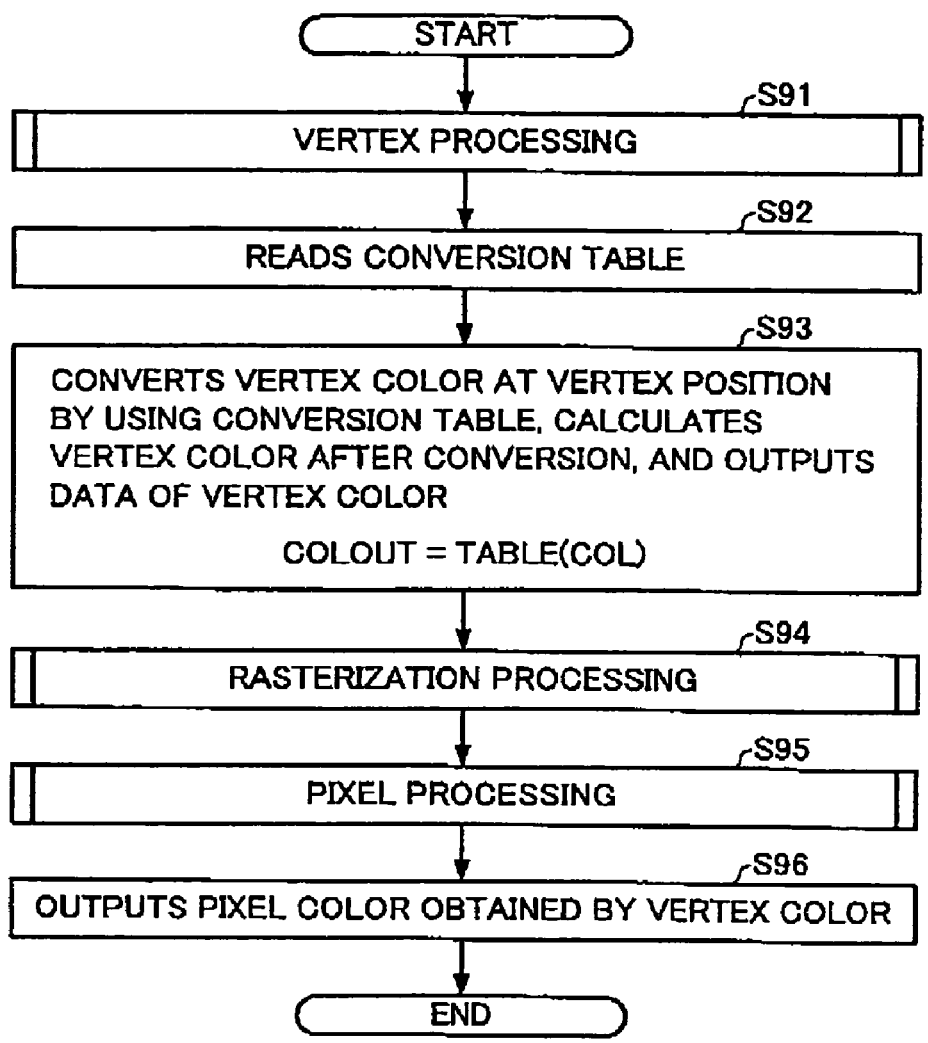
FIG. 17 is a flowchart of color conversion processing of a moving object.

FIG. 17 shows a flowchart of the color conversion processing performed for the moving object OBM.

The vertex processing section 122 performs vertex processing (step S91). The vertex processing is a third processing with a high load, as shown in FIG. 5B.

In the vertex processing, a conversion table (or conversion function) for the color conversion processing is read (step S92). The vertex color at the vertex position is converted using the conversion table (or conversion function), and the vertex color CLOUT after conversion is calculated according to the above expression (16) (step S93). The vertex processing is thus completed.

After the vertex processing has been completed, the. rasterization processing section 123 performs rasterization processing (step S94). In the rasterization processing, interpolation calculations of the vertex position, the vertex color, and the like are performed.

After the rasterization processing has been completed, the pixel processing section 124 performs pixel processing (step S95). The pixel processing is a fourth processing with a low load, as shown in FIG. 5B. Specifically, the pixel color obtained by the interpolation processing of the vertex color is output (step S96).

As shown in FIG. 16, when subjecting the background object to the color conversion processing, the load of the first processing (i.e. vertex processing) (step S82) is low, and the load of the second processing (i.e. pixel processing) (steps S85 and S86) is high. When subjecting the background object to the color conversion processing, since the number of pixel processing operations is usually smaller than the number of vertex processing operations, as shown in FIGS. 4B and 4C, the entire processing load can be reduced.

As shown in FIG. 17, when subjecting the moving object to the color conversion processing, the load of the third processing (i.e. vertex processing) (steps S92 and S93) is high, and the load of the fourth processing (i.e. pixel processing) (step S96) is low. When subjecting the moving object to the color conversion processing, since the number of vertex processing operations is usually smaller than the number of pixel processing operations, as shown in FIG. 4A, the entire processing load can be reduced.

3. Hardware Configuration

Figure 18:
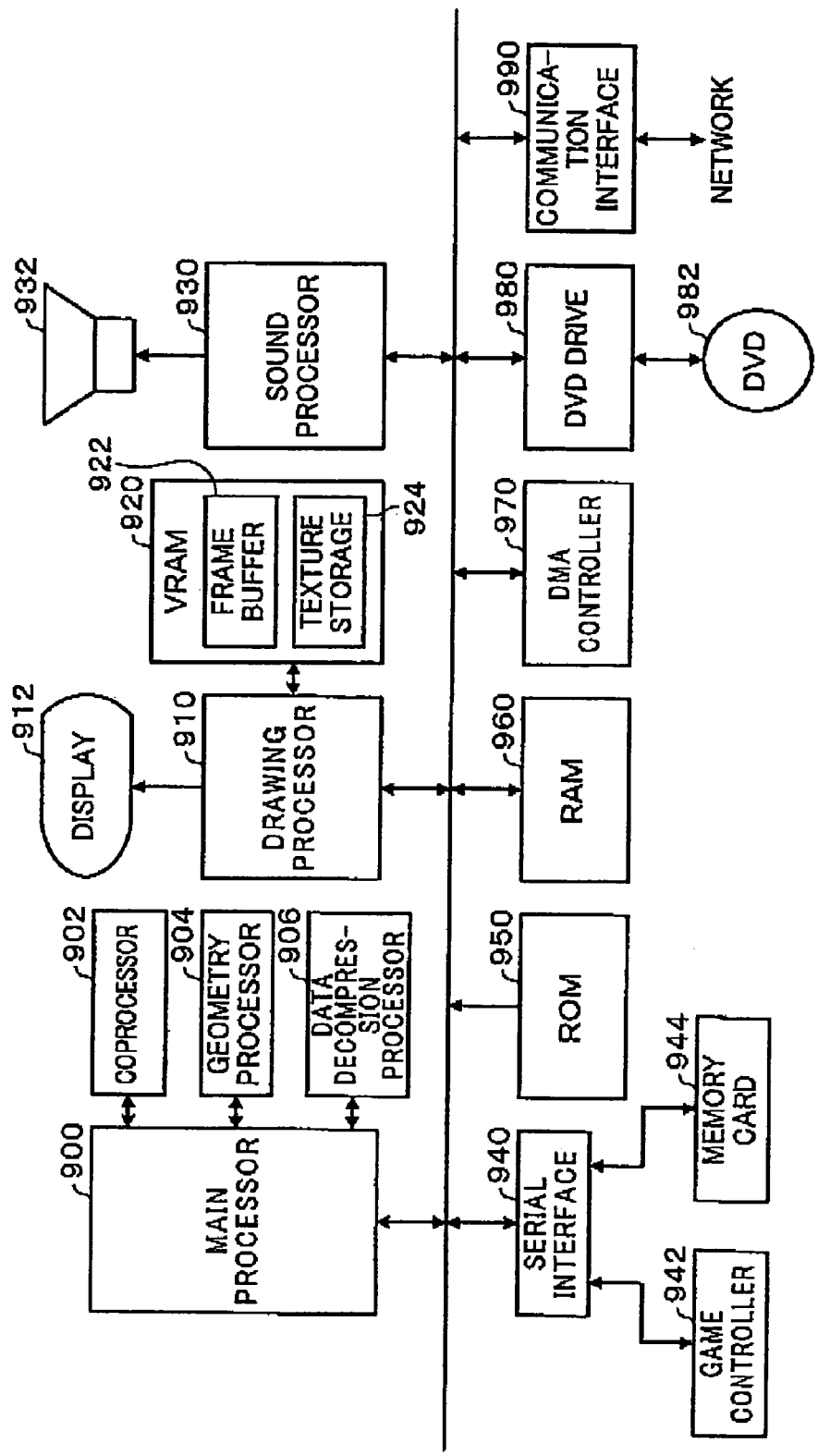
FIG. 18 shows a hardware configuration example.

FIG. 18 shows an example of a hardware configuration which can implement this embodiment. A main processor 900 operates based on a program stored in a DVD 982 (information storage medium; may be a CD), a program downloaded through a communication interface 990, a program stored in a ROM 950, or the like, and performs game processing, image processing, sound processing, and the like. A coprocessor 902 assists the processing of the main processor 900, and performs matrix calculation (vector calculation) at high speed. In the case where matrix calculations are necessary for physical simulation to cause the object to move or make motion, a program which operates on the main processor 900 directs (requests) the coprocessor 902 to perform the processing.

A geometry processor 904 performs geometric processing such as a coordinate transformation, perspective transformation, light source calculation, or curved surface generation based on instructions from a program operating on the main processor 900, and performs a matrix calculation at high speed. A data decompression processor 906 decodes compressed image data or sound data, or accelerates the decode processing of the main processor 900. This enables a video image compressed according to the MPEG standard or the like to be displayed in an opening screen or a game screen.

A drawing processor 910 draws (renders) an object formed by a primitive plane such as a polygon or a curved surface. When drawing an object, the main processor 900 delivers drawing data to the drawing processor 910 by utilizing a DMA controller 970, and transfers a texture to a texture storage section 924, if necessary. The drawing processor 910 draws an object in a frame buffer 922 based on the drawing data and the texture while performing hidden surface removal utilizing a Z buffer or the like. The drawing processor 910 also performs alpha blending (translucent processing), depth queuing, MIP mapping, fog processing, bilinear filtering, trilinear filtering, anti-aliasing, shading, and the like. When a programmable shader such as a vertex shader or a pixel shader is mounted, the programmable shader creates or changes (updates) vertex data or determines the color of a pixel (or fragment) according to a shader program. When the image of one frame has been written into the frame buffer 922, the image is displayed on a display 912.

A sound processor 930 includes a multi-channel ADPCM sound source or the like, generates game sound such as background music (BGM), effect sound, or voice, and outputs the generated game sound through a speaker 932. Data from a game controller 942 or a memory card 944 is input through a serial interface 940.

A system program or the like is stored in the ROM 950. In an arcade game system, the ROM 950 functions as an information storage medium, and various programs are stored in the ROM 950. A hard disk may be used instead of the ROM 950. A RAM 960 functions as a work area for various processors. The DMA controller 970 controls DMA transfer between the processor and the memory. A DVD drive 980 (may be a CD drive) accesses a DVD 982 (may be a CD) in which a program, image data, sound data, and the like are stored. The communication interface 990 transfers data with the outside through a network (communication line or high-speed serial bus).

The processing of each section (each means) according to this embodiment may be implemented by only hardware, or may be implemented by a program stored in the information storage medium or a program distributed through the communication interface. Or, the processing of each section may be implemented by hardware and a program.

When implementing the processing of each section according to this embodiment by hardware and a program, a program for causing the hardware (computer) to function as each section according to this embodiment is stored in the information storage medium. In more detail, the program directs each of the processors 902, 904, 906, 910, and 930 (hardware) to perform the processing, and transfers data to the processors, if necessary. The processors 902, 904, 906, 910, and 930 implement the processing of each section according to this embodiment based on the instructions and the transferred data.

Although only some embodiments of the invention have been described in detail above, those skilled in the art will readily appreciate that many modifications are possible in the embodiments without materially departing from the novel teachings and advantages of this invention. Accordingly, all such modifications are intended to be included within the scope of the invention. Any term (e.g. polygon or light scattering processing/texture coordinate calculation processing/lighting processing/color conversion processing) cited with a different term (e.g. primitive plane or predetermined processing) having a broader meaning or the same meaning at least once in the specification and the drawings can be replaced by the different term in any place in the specification and the drawings.

The method of assigning the processing to the vertex processing section and the pixel processing section is not limited to the method described in the above embodiment. A method equivalent to the above-described method is also included within the scope of the invention. The predetermined processing to which the method according to the invention is applied is not limited to light scattering, texture coordinate calculation, lighting, and color conversion processing. The method according to the invention may also be applied to various types of processing of which the efficiency can be improved by controlling assignment of the processing to the vertex processing section and the pixel processing section. The object of the first group is not limited to a background object and an object of which the constituent primitive plane is large. The object of the second group is not limited to a moving object and an object of which the constituent primitive plane is small.

The invention may be applied to various games. The invention may be applied to various image generation systems, such as an arcade game system, a consumer game system, a large-scale attraction system in which a number of players participate, a simulator, a multimedia terminal, a system board which generates a game image, and a portable telephone.

What is claimed is:

1. A computer-readable storage medium storing a program for generating an image, which when executed, causes a computer to function as:

an object space setting section which sets an object in an object space;

a vertex processing section which performs per-vertex processing; and a pixel processing section which performs per-pixel processing, wherein, when subjecting an object of a first group to predetermined processing which is implemented by a first processing and a second processing, the vertex processing section performs the first processing with a processing load lower than a processing load of the second processing, and the pixel processing section performs the second processing; and wherein, when subjecting an object of a second group differing from the first group to the predetermined processing which is implemented by a third processing and a fourth processing, the vertex processing section performs the third processing with a processing load higher than a processing load of the fourth processing, and the pixel processing section performs the fourth processing.

2. The computer-readable storage medium as defined in claim 1, wherein the object of the first group is a background object and the object of the second group is a moving object.

3. The computer-readable storage medium as defined in claim 1, wherein the object of the second group forms a primitive plane which is smaller than a primitive plane forming the object of the first group.

4. The computer-readable storage medium as defined in claim 1, wherein the predetermined processing is light scattering processing.

5. The computer-readable storage medium as defined in claim 4, wherein the vertex processing section performs the first processing which includes calculating a distance between a virtual camera and a vertex of an object; and wherein the pixel processing section performs the second processing which includes calculating a pixel color by out-scattering and a pixel color by in-scattering and adding the pixel color by out-scattering and the pixel color by in-scattering.

6. The computer-readable storage medium as defined in claim 4, wherein the vertex processing section performs the third processing which includes calculating a vertex color by out-scattering and a vertex color by in-scattering; and wherein the pixel processing section performs the fourth processing which includes adding a pixel color by out-scattering and a pixel color by in-scattering.

7. The computer-readable storage medium as defined in claim 1, wherein the predetermined processing is processing of texture coordinates calculation.

8. The computer-readable storage medium as defined in claim 7,
wherein the vertex processing section performs the first processing which includes outputting data of a normal vector of a vertex; and
wherein the pixel processing section performs the second processing which includes calculating texture coordinates of a pixel by subjecting a normal vector of the pixel to coordinate transformation and calculating a pixel color by texture mapping using the texture coordinates of the pixel.

9. The computer-readable storage medium as defined in claim 7,
wherein the vertex processing section performs the third processing which includes calculating texture coordinates of a vertex by subjecting a normal vector of the vertex to coordinate transformation; and
wherein the pixel processing section performs the fourth processing which includes calculating a pixel color by texture mapping using texture coordinates of a pixel.

10. The computer-readable storage medium as defined in claim 1, wherein the predetermined processing is lighting processing.

11. The computer-readable storage medium as defined in claim 10,
wherein the vertex processing section performs the first processing which includes outputting data of a normal vector of a vertex; and
wherein the pixel processing section performs the second processing which includes calculating light intensity of a pixel based on a normal vector of the pixel and an illumination model and calculating a pixel color based on the light intensity of the pixel.

12. The computer-readable storage medium as defined in claim 10,
wherein the vertex processing section performs the third processing including calculating light intensity of a vertex based on a normal vector of the vertex and an illumination model; and
wherein the pixel processing section performs the fourth processing including calculating a pixel color based on light intensity of a pixel.

13. The computer-readable storage medium as defined in claim 1, wherein the predetermined processing is color conversion processing.

14. The computer-readable storage medium as defined in claim 13,
wherein the vertex processing section performs the first processing which includes outputting data of a vertex position and a vertex color; and
wherein the pixel processing section performs the second processing which includes converting a pixel color by using a conversion table or a conversion function.

15. The computer-readable storage medium as defined in claim 13,
wherein the vertex processing section performs the third processing which includes converting a vertex color by using a conversion table or a conversion function; and
wherein the pixel processing section performs the fourth processing which includes outputting a pixel color calculated from the converted vertex color.

16. An image generation system for generating an image, the image generation system comprising:
an operation section which allows the input of operation data;
an object space setting section which sets an object in an object space;
a vertex processing section which performs per-vertex processing; and
a pixel processing section which performs per-pixel processing,
wherein, when subjecting an object of a first group to predetermined processing which is implemented by a first processing and a second processing, the vertex processing section performs the first processing with a processing load lower than a processing load of the second processing, and the pixel processing section performs the second processing; and
wherein, when subjecting an object of a second group differing from the first group to the predetermined processing which is implemented by a third processing and a fourth processing, the vertex processing section performs the third processing with a processing load higher than a processing load of the fourth processing, and the pixel processing section performs the fourth processing.

17. The image generation system as defined in claim 16, wherein the object of the first group is a background object and the object of the second group is a moving object.

18. The image generation system as defined in claim 16, wherein the object of the second group forms a primitive plane which is smaller than a primitive plane forming the object of the first group.

* * * * *